United States Patent [19]

Gurantz et al.

[11] Patent Number: 4,837,786

[45] Date of Patent: Jun. 6, 1989

[54] TECHNIQUE FOR MITIGATING RAIN FADING IN A SATELLITE COMMUNICATIONS SYSTEM USING QUADRATURE PHASE SHIFT KEYING

[75] Inventors: Itzhak Gurantz, San Diego; David A. Wright, Solana Beach, both of Calif.

[73] Assignee: Comstream Corporation, San Diego, Calif.

[21] Appl. No.: 894,316

[22] Filed: Aug. 7, 1986

[51] Int. Cl.⁴ .................. H04J 11/0; H04B 15/00
[52] U.S. Cl. ............................. 370/20; 375/1; 375/102; 375/38; 380/34
[58] Field of Search ............... 375/67, 39, 38, 102, 375/1; 370/19, 20, 21, 110.1, 85; 380/34

[56] References Cited

U.S. PATENT DOCUMENTS

| | | | |
|---|---|---|---|
| 3,035,169 | 5/1962 | Griffith | 455/10 |
| 3,365,666 | 1/1968 | Reynders et al. | 455/10 |
| 3,652,802 | 3/1972 | Schellenberg | 370/84 |
| 3,676,778 | 7/1972 | Mori | 455/13 |
| 3,681,694 | 8/1972 | Sarati | 340/147 SC |
| 3,896,382 | 7/1975 | Magenheim | 455/12 |
| 4,135,156 | 1/1979 | Sanders, Jr. et al. | 455/12 |
| 4,261,053 | 4/1981 | Dostis et al. | 375/67 |
| 4,287,598 | 9/1981 | Langseth et al. | 455/52 |
| 4,309,764 | 1/1982 | Acampora | 370/83 |
| 4,427,995 | 1/1984 | Naito | 455/3 |
| 4,455,651 | 6/1984 | Baran | 375/1 |
| 4,528,674 | 7/1985 | Sweeney et al. | 375/102 |
| 4,601,046 | 7/1986 | Halpern et al. | 375/102 |

OTHER PUBLICATIONS

Walter R. Braun and William C. Lindsey, "Carrier Synchronization Techniques for Unbalanced QPSK Signals—Part I", IEEE Transactions on Communications, vol. Com—26, No. 9, Sep. 1978, pp. 1325–1333.
Walter R. Braun and William C. Lindsey, "Carrier Synchronization Techniques for Unbalanced QPSK Signals—Part II", IEEE Transactions on Communications, vol. Com—26, No. 9, Sep. 1978, pp. 1334–1341.
R. C. Dixon, "Spread Spectrum Systems," *John Wiley & Sons*, 1976, pp. 6–7, 128–131, 138–145, 177, 205–209, 265–272, 276–277, 283–285.
Philipp Hartl, "Fernwirktechnik der Raumfahrt", (Telecontrol Technology in Astronautics), *Springer—Verlag*, 1977, pp. 155–161, (including translation from German to English).
James Martin, "Communication Satellite Systems", Prentice Hall, Inc., 1978, pp. 22, 53, 142–147, 189, 358–359, 365–367.
Report 708 of the comite Consultatif International des Radiocommunications (CCIR), Geneve, 1978, vol. IV, 4.2.4, p. 131.
Tares, et al., "Systems for Telecommunications by Satellite", 1978, pp. 78–79, (including translation from French to English).

(List continued on next page.)

*Primary Examiner*—Robert L. Griffin
*Assistant Examiner*—Andrew J. Telesz, Jr.
*Attorney, Agent, or Firm*—Knobbe, Martens, Olson & Bear

[57] ABSTRACT

A system for data communication between ground stations using an orbiting satellite as a relay includes a technique for avoiding the loss of signals from the satellite during periods of heavy precipitation. Data is communicated from an orbiting satellite to a plurality of earth stations on a single transmission frequency. The data is communicated on two separate transmission channels on that one frequency by using orthogonal channels of a coherent phase quadrature transmission system. The overall data rate on one of the two transmission channels is much lower than the overall data rate on the other of the two channels. The data on the lower data rate channel is less likely to be affected by heavy precipitation occurring in the line of sight between the satellite and the ground station, and the lower data rate channel is thus used to communicate data to a ground station located in an area of heavy precipitation. The lower data rate channel is further used to maintain phase synchronization so that the probability of losing phase synchronization with the signal transmitted by the satellite is significantly reduced.

13 Claims, 10 Drawing Sheets

OTHER PUBLICATIONS

"Techniques de Modulation par Etalement du Spectre", (Techniques for Modulation by Spreading of the Spectrum), *Report* 651, CCIR, vol. 1, 1978, pp. 1–22, (including translation from French to English).

E. Herter, et al., "Nachrichtenubertragung uber Satelliten", (Information Transmission via Satellite), *Springer—Verlag*, 1979, pp. 1–25, (including translation from German to English).

Gilbert E. LaVean, "Defense Satellite Communications Systems", *Progress In Astronomy and Aeronautics*, vol. 41, 1970, pp. 309–321.

H. Blasbalg, "A Comparison of Pseudo—Noise and Conventional Modulation for Multiple—Access Satellite Communications", *IBM Journal*, Jul. 1965, pp. 241–255.

J. W. Schwartz et al., "Modulation Techniques for Multiple Access to a Hard—Limiting Satellite Repeater", *Proceedings of the IEEE*, vol. 54, No. 5, May 1966, pp. 763–777.

Herman Blasbalg et al., "Air—Ground, Groung—Air Communications Using Pseudo—Noise Through a Satellite", *IEEE Transactions On Aerospace And Electronic Systems*, vol. AES—4, No. 5, Sep. 1968, pp. 774–791.

Robert S. Lawton et al., "A Family of SHF Tactical Satellite Communication Ground Terminals", *IEEE Transactions on Aerospace and Electronic Systems*, vol. AES—6, No. 2, Mar. 1970, pp. 137–146.

S. J. Campanella et al., "Subjective Evaluation of Dedicated Multiple—Hop Satellite Communications for Government and Military User", *IEEE Transaction on Communication Technology*, vol. 15, No. 5, Oct. 1970, pp. 123–132.

Irwin L. Lebow et al., "Satellite Communications to Mobile Platfroms", *Proceedings of the IEEE*, vol. 59, No. 2, Feb. 1971, pp. 139–159.

Philip Konop, "The Effect of Hard Limiting at the Input to a GPS Receiver in a High—Random—Noise and High—Jamming Environment", 1976 *National Telecommunications Conference*, vol. III, Dallas, Tex., Nov. 29–Dec. 1, 1976, pp. 41.5-1 to 41.5-5.

Forsker Hakon Nymoen, "Bruk av PCM ved Satellitt—Kommunikasjon", Telektronikk, vol. 4, Apr. 1971, pp. 233–239, (including a translation from German to English).

R. S. Padgett et al., "Microprocessor—Controlled Spread—Spectrum Demodulation", *Eascon* '76, Sep. 26–29, 1976, pp. 58A–58G.

Norbert B. Hemesath et al., "Anti—Jamming Characteristics of GPS/GDM", 1976 *National Telecommunications Conference*, vol. III, Dallas, Tex., Nov. 29–Dec. 1, 1976, pp. 41.6-1 to 41.6-5.

Jerry D. Holmes, "GPS Clear/Acquisition Code Sprectral Properties", 1976 *National Telecommunications Conference*, vol. III, Dallas, Tex., Nov. 29, Dec. 1, 1976, pp. 41.7-1 to 41.7-5.

Bradford W. Parkinson, "Navstar Global Positioning System, (GPS)", 1976 *National Telecommunications Conference*, vol. III, Dallas, Tex, Nov. 29, Dec. 1, 1976, pp. 41.1-1 to 41.1.

James L. Baker, "Sailboat Search and Rescue Experiment", *IEEE Journal of Oceanic Engineering*, vol. OE—2, No. 3, Jul. 1977, pp. 285–287.

Aaron Weinberg et al., "A Novel Concept for a Satellite—Based Maritime Search and Rescue Systems", *IEEE Journal of Oceanic Engineering*, vol. OE—2, No. 3, Jul. 1977, pp. 274–285.

Jacques Fagot et al., "Frequency Modulation Theory; Application to Microwave Links ", *IEEE Transactions on Communication*, vol. COM—25, No. 8, Aug. 1977, pp. 835–855.

H. J. Kochevar, "Spread Spectrum Multiple Access Communications Experiment Through a Satellite", *IEEE Transactions on Communications*, vol. COM—25, No. 8, Aug. 1977, pp. 853–855.

Nirode C. Mohanty, "Spread Spectrum and Time Division Multiple Access Satellite Communications", *IEEE Transactions on Communications*, vol. COM—25, No. 8, Aug. 1977, pp. 853–855.

F. W. Sarles, Jr. et al., "The Lincoln Expertimental Satellites Les 8 and 9", *IEEE Eascon*—77, Arlington, Va., Sep. 26–28, 1977, pp. 221.1A–21.1U.

W. F. Ultlaut, "Spread—Spectrum Principles and Possible Application to Spectrum Utilization and Allocation", *Telecommunication Journal*, vol. 45, Jan. 1978, pp. 20–32.

(List continued on next page.)

OTHER PUBLICATIONS

Andrew J. Viterbi, "A Processing Satellite Transponder for Multiple Access by Low—Rate Mobile Users", *Fourth International Conference on Digital Satellite Communications,* Montreal, Canada, Oct. 23-25, 1978, pp. 166-174.

Waddah K. Alem et al., "Spread Spectrum Acquisition and Traching Performance for Shuttle Communication Links", *IEEE Transactions on Communications,* vol. COM—46, No. 11, Nov. 1978, pp. 1689-1703.

Edward F. Prozeller, "Application of the Spread—Spectrum Signals from the NOVA Satellites", *Navigation Satellite Users: Proceedings of the National Aerospace Symposium,* Springfield, Va., Mar. 6-8, 1979, pp. 93-100.

George R. Cooper et al., "Cellular Land—Mobile Radio", Why Spread Spectrum?, *IEEE Communications Magazine,* Mar. 1979, pp. 17-24.

Andrew J. Viterbi, "Spread Spectrum Communications—Myths and Realities", *IEEE Communications Magazine,* vol. 17, No. 3, May 1979, pp. 11-18.

Leon J. Ricardi, "Some Factors that Influence EHF Satcom Systems", *EASCPN '79; Electronics and Aerospace Systems Conference,* Arlington, Va., Oct. 9-11, 1979, pp. 617-622.

B. H. Batson et al., "Spread Spectrum Techniques for the Space Shuttle", *IEEE NTC '79,* Washington, Nov. 27-29, 1979, pp. 54.4.1 to 54.4.5.

S. H. Durrani et al., "Communications Satellite System Concepts Based on the AMPA Experiment", 169 *Journal of Spacecraft and Rockets,* vol. 17, No. 1, Jan.-Feb. 1980, pp. 15-19.

S. D. Buckingham, "The Spread Spectrum Controversy", *Electronics & Power,* Mar. 1980, pp. 222 and 224.

John Husted et al., "Low Cost Satellite Data Transmission Networks Using Demand Assigned IDMA", pp. 7-14.

Steven Salamoff et al., "Dynac: A Low—Cost Data/Voice Communications Network", pp. 166-169.

R. F. Ormondroyd et al., "Spread Spectrum Communication Systems for the Land Mobile Service", *The School of Electrical Engineering University of Bath,* pp. 273-287.

Charles R. Cahn, "Spread Spectrum Applications and State—of—the—Art Equipments", pp. 5-6.

Victor J. Young et al., "Beam Loading", *Microwave Dictionary,* No. 188, pp. 10-11.

L. J. Milosevic, "Integrated Navigation, Traffic Control, Collision Avoidance and Communication System", SINTAC—C2, pp. 253-268.

Leonard Jacobson, "User Equipment for the Navstar Global Positioning System", pp. 41.4-1 to 41.4-5.

Livre de J. Peres et al., "Les Systemes de Telecommunication par Satellite", Editions Masson, pp. 78-111.

Paul R. Drouilhet Jr., et al., "A Bandspread Modulation—Demodulation System for Multiple Access Tactical Satellite Communication", *EASCON '69 Record, pp. 126-132.*

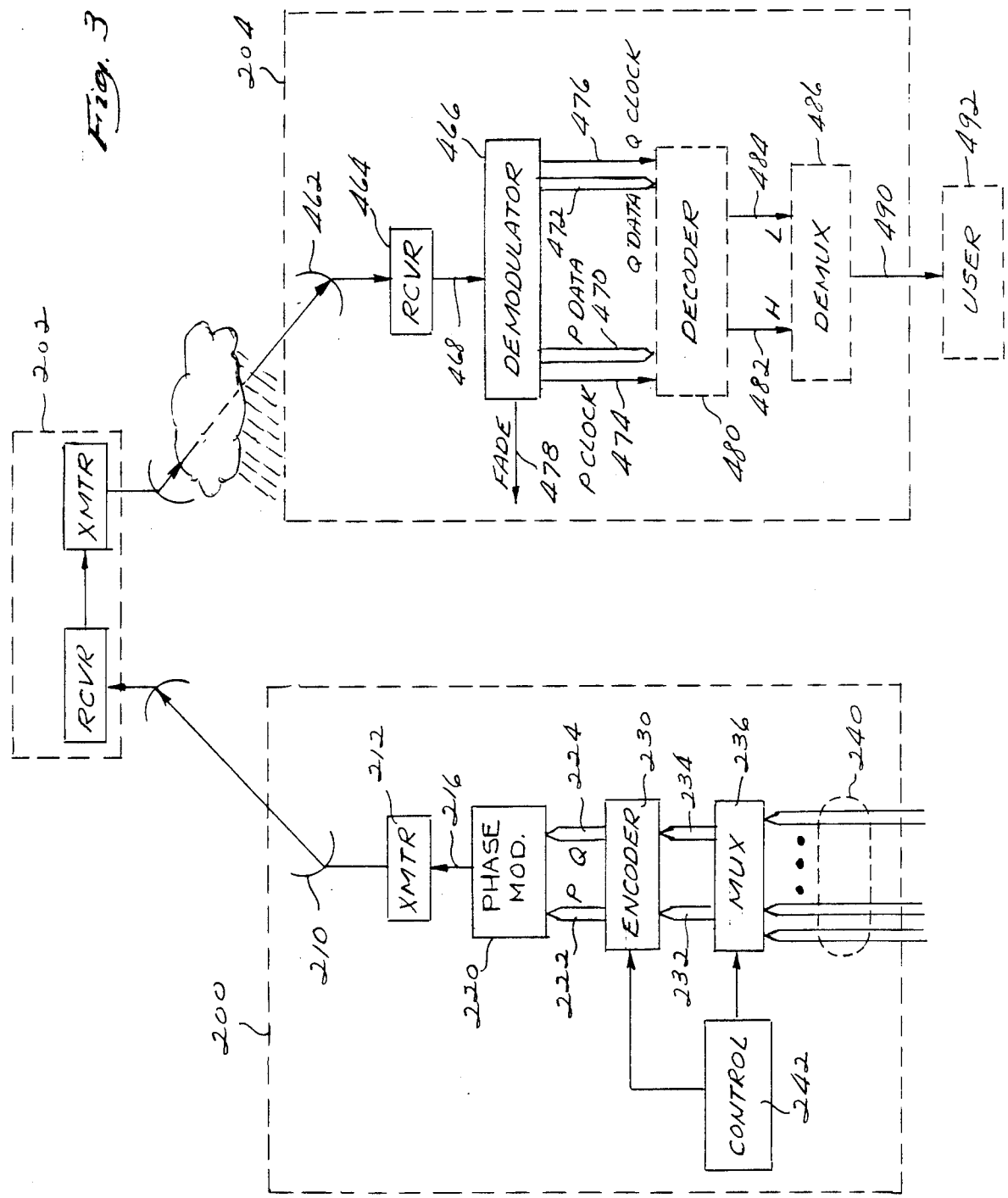

Fig. 6a P DATA

Fig. 6b Q DATA

SEQUENCE GENERATOR OUTPUT

Fig. 6d Q' DATA

TECHNIQUE FOR MITIGATING RAIN FADING IN A SATELLITE COMMUNICATIONS SYSTEM USING QUADRATURE PHASE SHIFT KEYING

BACKGROUND OF THE INVENTION

1. Field of the Invention

The present invention relates to the transmission of data between two locations using a radio frequency carrier, and, more particularly, relates to the transmission of data from an orbiting satellite to the ground and a technique for mitgating the effect of heavy precipitation on transmissions between the orbiting satellite and an earth station when heavy precipitation causes attenuation of the signal transmitted from the satellite.

2. Description of the Related Art

In domestic satellite communication systems, the Ku band, corresponding to frequencies in the range of 12-14 gigahertz, is widely used to transmit digital data signals from an orbiting satellite to a plurality of ground stations. Although the satellite is orbiting at a height such that it is virtually unaffected by weather conditions on the earth, the signals which propagate between the satellite and the ground stations must travel through the earth's atmosphere and are thus subjected to the weather conditions that exist along the line of sight between the satellite and any particular ground station. A major drawback associated with the use of the Ku band for communications between the ground stations and an orbiting satellite is that the signals in the 12-14 GHz range are attenuated by rainfall. For example, the passage of an active cumulonimbus storm cell across the line of sight between a ground station and the satellite can cause sufficient attenuation such that the ground station is no longer able to detect and discriminate the modulated signal being transmitted by the satellite. This attenuation is called "rain fading"; however, it can result from snow, sleet, or other atmospheric conditions. Although the same effect will occur for signals transmitted from the ground station to the satellite, typically a ground station is not power limited, and thus the attenuation can be overcome by increasing the power in the signal transmitted by the ground station. On the other hand, an exemplary satellite typically has a limited amount of power available to operate its transmitter and associated circuitry. Thus, it is generally not feasible to overcome the attenuation caused by precipitation by simply increasing the transmitted power of the satellite. For example, if precipitation is causing a 10 dB attenuation in the signal received by a particular ground station, the power in the signal transmitted by the satellite would have to be increased by 10 dB in order to overcome the attenuation. This corresponds to a ten-fold increase in the power requirements of the satellite (i.e., from 5 watts to 50 watts). To increase the power by this amount may require more than a ten-fold increase in cost. Furthermore, since it is likely that only one or a few of the ground stations are affected by rain-induced attenuation at any given time, the increase in the transmitted power would result in the unaffected ground stations receiving ten times the power which they need to receive. Thus, simply increasing the transmitted power of the satellite is not a desired solution to the problem.

Certain techniques have developed for overcoming the problem of rain fading. For example, U.S. Pat. No. 4,309,764, to Acampora, describes a technique in which the digital data transmitted from the satellite to the ground stations using a Time Division Multiple Access (TDMA) technique. The transmitted signal includes spare TDMA time slots in each frame sequence that are shared among all the ground stations and which can be allocated to a ground station experiencing rain fading. For example, a ground station experiencing rain fading may be provided with the equivalent of three additional time slots so that the data is transmitted in an encoded form that can be more readily detected in the presence of a high level of attenuation. The extra time slots require the frame sequence to be longer and thus this method causes a decrease in the overall data rate of the transmitted data.

In U.S. Pat. No. 4,287,598, to Langseth, et al., a system is described which provides land communication paths between the ground stations. In the event the signal from the satellite to a particular ground station is attenuated to the point of terminating the communication between the ground station and the satellite, the communication is redirected to a second ground station that is located outside the area of the fade condition and is then transmitted to the affected ground station via a land communication path. This, of course, partially eliminates one of the advantages of having a satellite communication system in that a land communication system is required to maintain communications. U.S. Pat. No. 3,896,382, to Magenheim, discloses a similar technique for rerouting the transmission from the satellite through an alternative ground station (FIG. 1) separated from the primary ground station by a relatively large distance. In the alternative, the Magenheim patent shows the transmission from the ground station to a second satellite at a different angle that avoids the rain cell causing the attenuation. Both of these techniques require additional equipment and are thus costly to implement.

U.S. Pat. No. 3,676,778, to Mori, discloses a satellite communication system in which the receivers and transmitters operate at a plurality of frequency bands having differing attenuations in the presence of precipitation. Mori describes a technique that mitigates the rain fading problem by assigning frequency bands having low attenuation to precipitation to those ground stations incurring attenuation at the primary frequency band, while maintaining communication at the primary frequency for the unaffected ground stations This, of course, requires the satellite to have at least two transmitters for transmitting on the two (or more) frequency bands. This requires additional hardware in the satellite and also requires additional power to operate the second transmitter.

A need continues to exist for a technique for communicating between a satellite and a ground station that provides a means for mitigating the effect of attenuation of the signal caused by precipitation in the line of sight between the satellite and the ground station without the need for ground communication channels or alternate satellite to ground signal paths.

SUMMARY OF THE INVENTION

The present invention is an apparatus and method for transmitting communications signals between two locations. Two communications channels are provided on a single carrier frequency. One of the channels is particularly suitable for providing continuing communication in the presence of signal conditions that substantially prevent communication on the other channel, such as attenuation caused by precipitation in the signal path between the two locations. For example, the present invention is advantageously useable in an exemplary communications system having a satellite for receiving signals transmitted by one ground station and for retransmitting the received signals to one or more ground stations. The invention does not require an additional transmitter in the satellite, nor does it require the transmission power of the satellite to be increased to overcome the attenuation. Furthermore, the transmission continues to occur between the satellite and the affected ground station, rather than rerouting the transmission to an alternative ground station and then using land communication to complete the transmission link.

The present invention includes a satellite transmitter operating at a single frequency. The data transmitted from the satellite to a plurality of ground stations is imposed upon the transmission carrier frequency by quadrature phase shift keying. First and second data transmission channels are provided at the same frequency by shifting the phase of the carrier signal in accordance with the instantaneous state of the two data transmission channels. Thus, the phase of the signal received by the ground station has phase information which can be demodulated to reproduce the two separate digital data channels. In the preferred embodiments of the invention, both digital data channels are operated at the same channel symbol ("chip") rate. However, one of the digital data channels is selected to operate at a lower bit or data rate by encoding the data transmitted on that channel, using multiple chips per bit, so that the data can be more readily detected in the presence of signal fading.

In one application of the present invention, the higher data rate channel is the primary communications path from the satellite to a plurality of ground stations. The lower data rate channel can be advantageously used to transmit essential network control functions such as frame synchronization, cryptographic keys and initialization vectors (when implemented), and demand assignment directives. The frame synchronization that is transmitted on the lower data rate channel is used by the ground stations to maintain phase synchronization of both data channels with the signal being transmitted by the orbiting satellite. Thus, the use of the lower data rate channel for transmitting the frame synchronization information substantially increases the probability that each of the ground stations will maintain synchronization with the transmitted signal during periods of heavy rain fading which may preclude communications on the higher data rate channel.

In one particular embodiment of the present invention, the satellite communications system is used to transmit broadcast information to a plurality of ground stations, wherein each of the ground stations is intended to receive all of the information that is transmitted. For example, the satellite communications systems may be used by a news service to transmit news stories, stock market quotes, emergency information, and other information from a central location to a plurality of receiving stations which retransmit the information in a given area. In such an embodiment, the higher data rate channel is used to transmit routine information, such as news stories, for which the time of receipt is not critical. On the other hand, data having a degree of urgency, is transmitted on the lower data rate channel so that the probability that the data will be received and acted upon is substantially increased. For example, the lower data rate channel can be advantageously used to transmit emergency broadcasts, such as reports of hazardous weather conditions, current stock market quotations, or the like.

In alternative embodiments of the present invention, the satellite communications system is used for the transmission of addressed traffic. In other words, a portion of each data transmission frame is directed towards a particular ground station. The data communications to each ground station is preferentially transmitted on the higher data rate channel. The use of the higher data rate channel enables the system to transmit more information in a given unit of time than if the lower data rate channel were used exclusively. When a ground station is affected by precipitation that occurs in the line of sight between the orbiting satellite and the ground station, the data transmissions to that particular ground station are rerouted from the higher data rate channel to the lower data rate channel to increase the margin of the signal level over the noise level. The ground station then has a substantially higher probability of correctly receiving the data transmission directed to it. When the level of precipitation in the line of sight decreases to a level such that the attenuation caused by the precipitation no longer deleteriously affects the signal on the higher data rate channel, the communications to the affected ground station are redirected to the higher data rate channel so that the resources of the lower data rate channel are available for other ground stations which may become affected by precipitation. This is particularly advantageous when the precipitation is part of a storm cell which is moving across the country and is sequentially affecting a plurality of ground stations.

The present invention is particularly advantageous for mitigating signal attenuation between a satellite and a ground station (i.e., attenuation of the downlink). The present invention can also be advantageously used to mitigate attenuation on the unlink from the ground station to the satellite, particularly when the transmitting ground station is a mobile unit or other system having low transmission power output or another impairment.

In preferred embodiments of the present invention, the signal level in the higher data rate channel and the lower data rate channel are substantially equal. In alternative embodiments of the present invention, the signal level in one of the data channels can be increased to further increase the signal-to-noise ratio of the data transmitted on that channel. The signal levels can advantageously be adjusted so that the signal-to-noise ratio of the higher data rate channel in the absence of any precipitation is approximately the same as the signal-to-noise ratio of the lower data rate channel in the presence of heavy precipitation. Thus, the system resources (i.e., the available transmission power in the satellite) can be allocated so that neither channel has more or less than the power necessary to maintain communication.

BRIEF DESCRIPTION OF THE DRAWINGS

FIGS. 6a-d are graphical representations of exemplary waveforms showing the P data channel, the Q data channel before spreading, the spread sequence, and the Q data channel after spreading, respectively.

FIG. 17a is a graphical representation of an error function in the programmable/selectable error function RAM of FIG. 12, showing the angular error output $\delta$ as a function of the input $\rho$ when the Q channel has three times the modulation power as the P channel.

DETAILED DESCRIPTION OF THE PREFERRED EMBODIMENTS

Figure 1:
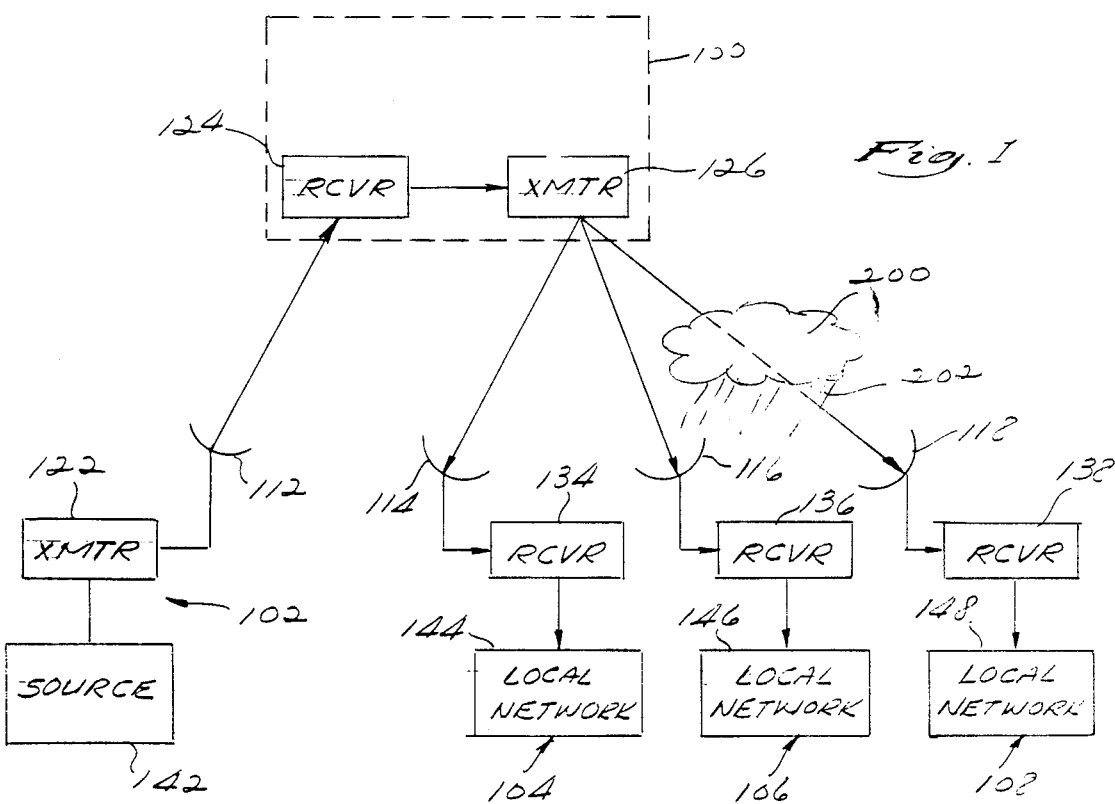
FIG. 1 is a pictorial block diagram of an exemplary prior art satellite communication system.

FIG. 1 is a pictorial illustration of an exemplary satellite communication system. The communication system includes an orbiting satellite 100, which is preferably in geostationary orbit such that it remains in substantially the same location with respect to the surface of the earth. The satellite communication system further includes a plurality of ground stations 102, 104, 106, 108. Although only four ground stations are shown in FIG. 1, one skilled in the art will understand that the number of ground stations transmitting and receiving data from the satellite 100 can be considerably more than the number shown in FIG. 1.

Each of the ground stations 102, 104, 106, 108 includes a directional antenna, commonly referred to as a parabolic dish antenna, which is precisely directed at the satellite 100. For example, the ground station 102 has an antenna 112, the ground station 104 has an antenna 114, the ground station 106 has an antenna 116, and the ground station 108 has an antenna 118. Typically, a satellite communication system, such as the one illustrated in FIG. 1, can operate in one of two exemplary modes. For example, in FIG. 1, the ground station 102 comprises a radio frequency transmitter 122 that is electrically connected to the antenna 112 so that radio frequency signals generated by the transmitter 122 are radiated by on the radio frequency signal can be discriminated in the presence of ambient noise. In other words, the signal-to-noise ratio of the receiver signal must be of a sufficient level that it can be successfully detected by the receiver 138.

One preferred embodiment of the present invention concerns itself primarily with problems caused by changes in the weather in the vicinity of the receiving antenna 118. More particularly, this embodiment of the present invention is primarily concerned with the effect of precipitation occurring in the line of sight between the satellite 100 and the receiving antenna 118. This is pictorially illustrated by a cloud 200 generating precipitation 202, such as heavy rain, snow, sleet, or the like.

As is well known in the satellite communication field, radio frequency transmissions in the Ku band (12-14 gigahertz) are particularly affected by precipitation in the line of sight between the satellite 100 and the receiving antenna 118. As the signal transmitted by the satellite 100 passes through the heavy precipitation 202, the signal is attenuated. Thus, the level of the signal with respect to background noise at those frequencies becomes smaller and smaller. For example, studies have shown that for domestic commercial satellite communications in the United States, attenuation of the signal (referred to herein as signal fading) of two dB or greater occurs with a probability of approximately 1%. This figure is an average over the entire United States and varies, depending on geographic location, with higher probabilities occurring in the South Atlantic states, where heavy precipitation occurs more frequently, and with much lower probabilities occurring in the Southwestern regions, such as Southern California and Arizona. The probability of deeper fades (i.e., greater attenuation) thus varies in accordance with the location of the the antenna 112 so that the radio signal propagates through that portion of the earth's atmosphere between the antenna 112 and the satellite 100 and is received by the satellite 100. The satellite 100 includes a receiver 124 that receives the signal transmitted by the antenna 112, and further includes a transmitter 126 which retransmits the received signal back towards the ground. The retransmitted signals are received by the antennas 114, 116 and 118 and are electrically communicated to respective receivers 134, 136 and 138. Each of the receivers 134, 136, 138 demodulates the received signal and provides it to a local destination. For example, when the satellite communication system in FIG. 1 is used by a news service, or the like, represented by a data source 142, digital data information that is representative of the various news stories is provided to the transmitter 122 which modulates the radio frequency signals in a pattern representative of the digital data as the radio frequency signal is provided to the antenna 112. When the modulated radio frequency signal is received by the receivers 134, 136, 138, via their respective antennae 114, 116, 118, the radio frequency signal is demodulated, thereby reproducing the original data input to the transmitter 122, from the data source 142. The demodulated data is then provided to local networks which may be news services, such as newspapers, radio stations, television stations, or the like, via land communication systems utilizing conductive wire, fiber optics, microwave links, or the like. The local networks are represented by the blocks 144, 146 and 148 in FIG. 1. The exemplary system of FIG. 1 thus uses the radio communications path from the transmitting antenna 112 to each of the receiving antennas 114, 116, 118 via the satellite 100 to replace miles of wire or fiber optics, or a series of microwave repeater stations. The advantages of doing this are well known and will not be discussed herein.

In alternative embodiments of FIG. 1, each of the earth stations 102, 104, 106, 108 includes both a transmitter and a receiver to provide two-way communication between the ground stations. Such a system may be used for example in a telephone communication system to provide long distance communication between various geographic areas without requiring extensive proliferation of the earth's surface with telephone wires or microwave towers. In such communication systems, the same data transmission links are often used to transmit digital data, such as that transmitted between computer terminals, teletype machines, or the like. In exemplary systems, the voice data between telephone transmitters and receivers is digitized and transmitted along with the digital data between the computer terminals, and the like.

Figure 2:
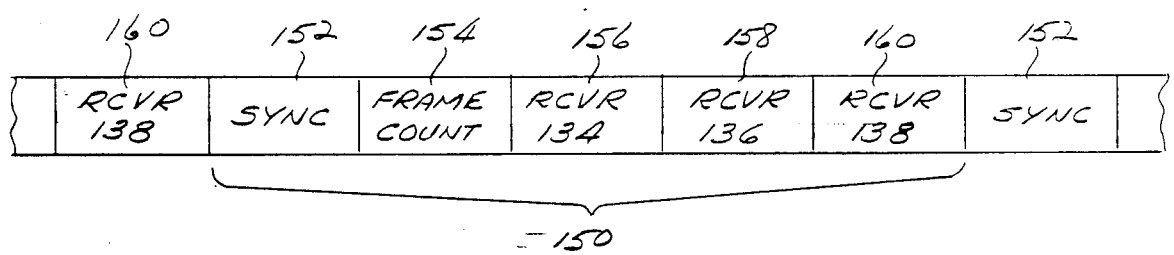
FIG. 2 is a simplified representation of a frame of data in an exemplary time division multiplexed communication system.

Typically, the data transmission schemes used to transmit the data in either of the foregoing exemplary systems use some form of multiplexing. For example, one scheme which may be seen in the system of FIG. 1 is time division multiplexing (TDM). In time division multiplexing, the data transmitted from one ground station to the satellite and then to another ground station is included in a digital data stream that is time division multiplexed. As is well known in the art, in time division multiplexing, the digital data is transmitted in frames having a predetermined number of data information bits in each frame. Within each frame, a predetermined number of bits are used for frame synchronization and identification and the remaining bits are used to define time slots and to provide error checking capabilities. For example, FIG. 2 illustrates a highly simplified frame of data 150 that is transmitted from the transmitter 122 to each of the receivers 134, 136, 138. The exemplary frame of data 150 typically includes a synchronization pattern 152 that designates the beginning of each frame 150 and is utilized to synchronize circuitry within each of the receivers 134, 136, 138 with the transmitted data. The frame 150 may advantageously include a predetermined number of bits of data that comprise a frame count 154 that is incremented by the data source 142 once for each frame. Following the frame count 154 is a time slot 156 which comprises a predetermined number of bits of data that are directed to the receiver 134. The time slot 156 is followed by a time slot 158 which comprises a predetermined number of bits directed to the receiver 136, which is in turn followed by a time slot 160 comprising a predetermined number of bits directed to the receiver 138. The frame 150 is followed by subsequent frames, each beginning with the synchronization pattern 152. In the exemplary addressed operation, each of the receivers 134, 136, 138 receives all the information transmitted by the transmitter 122. Within each of the receivers 134, 136, 138, demultiplexing logic selectively extracts the data information bits intended for the respective receiver. For example, the receiver 138 advantageously selects only the data information bits in the time slot 156 in each frame 150 and provides the output information to the respective local network 148. One skilled in the art will understand that there are a number of different time division multiplexing techniques, each having their own particular advantages and disadvantages.

In order for the local network 148 of FIG. 1 to receive the information directed to it, whether it is broadcast information from a news service or digitized voice and data information specifically directed to it, the signal from the transmitter 122 must successfully propagate from the ground transmitter antenna 112 to the receiver 124 in the satellite 100 and then be retransmitted by the transmitter 126 in the satellite 100 to the antenna 118 to be received by the receiver 138. The signal received by the receiver 138 must have a sufficient strength so that the data information imposed receiver in the country. For example, an attenuation of 15-20 dB can occur with a frequency of approximately 0.01% in the South Atlantic states. Such deep fades are essentially unknown in the Southwestern regions. In those regions, an attenuation of 5-7 dB may have a 0.01% probability of occurring.

In order to compensate for the fading caused by precipitation, the signal level transmitted by the satellite 100 can be increased by increasing the power of the transmitter within the satellite 100. For example, in order to avoid the loss of signal caused by the 2 dB fades, the transmitted power can be increased by 2 dB over the signal required for clear weather. This corresponds to an increase in the transmitted power of approximately 60%, (e.g., from 5 watts to 8 watts, for example). Thus, the operator of an exemplary satellite system may consider it worthwhile to increase the power by that amount to avoid the 1% probabilities of rain fading in the amount of 2 dB. On the other hand, it would require a ten-fold increase in transmitted power in order to avoid a 10 dB rain fade, such as those that occur with a frequency of greater than 0.01% in the South Atlantic states. Most operators would probably consider the cost, both in the size of the satellite required, and in the expense of the equipment contained therein, prohibitive. On the other hand, the ultimate user of the data that is being blocked by the precipitation 202 is typically not interested in the operator's financial reasons for not providing an adequate rain margin when the user discovers that he or she is no longer receiving data from the receiver 138. Thus, the operators of satellite communication systems have developed a number of techniques for maintaining the communication to the receiver 138 or directly to the local network 148 when the precipitation 202 effectively blocks the transmission from the satellite 100 to the antenna 118. A few of those techniques are described in the Background of the Invention.

Another possible solution is to increase the power transmitted by the transmitter in the satellite 100 when the receiver 138 detects that the signal received via the antenna 118 is approaching the lower limits of detectability. Of course, this solution means that each of the receivers 134 and 136, which are outside the influence of the precipitation 202, will receive much more power than is necessary to receive a clear signal. In a case where a cell of heavy precipitation 202 is moving from area to area and thus sequentially blocking the signal transmitted from the satellite 100 to each of the antennas 114, 116, 118, the satellite 100 may have to maintain the high level of power transmission for an extended amount of time. Accordingly, the power source would have to be designed to maintain the high power level for an extended amount of time. Furthermore, as set forth above, it may not be practical to provide a transmitter having the capabilities of transmitting a signal of sufficient strength to penetrate a heavy level of precipitation such as may occur in an active cumulonimbus storm cell.

The present invention, which will be described below in connection with FIGS. 3-17, is an apparatus and a method that enables a satellite communication system to maintain communication with a ground station, such as the ground station 108 in FIG. 1, even in the presence of a heavy level of precipitation along the line of sight between the satellite 100 and the antenna 118.

Figure 4A:
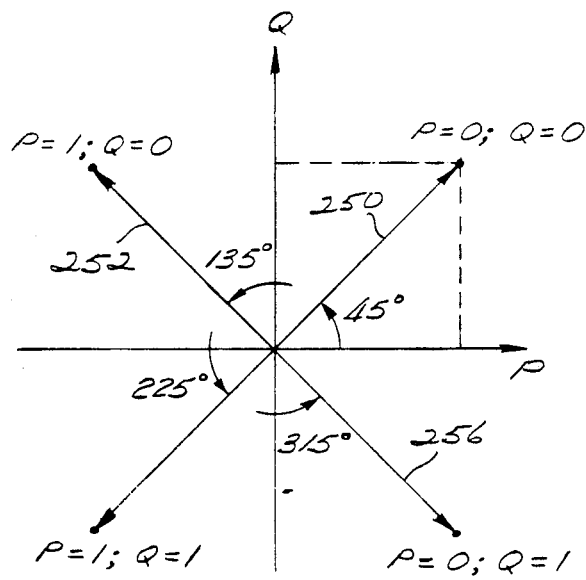
FIG. 4a is a graphical representation of the phase shift of a single frequency carrier signal when modulated with two channels of data using quadrature phase shift keying, showing equal modulation on both channels.
Figure 4B:
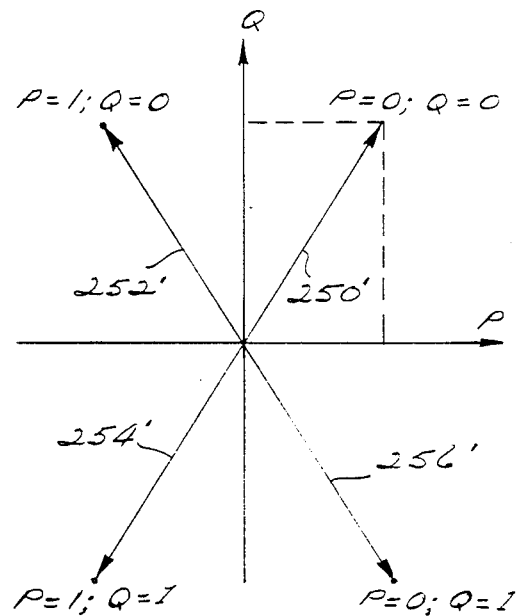
FIG. 4b is a graphical representation of the phase shift of a single carrier signal when modulated with channels of data using quadrature phase shift keying, as in FIG. 4a but with more modulation power applied to the Q channel than to the P channel.
Figure 5:
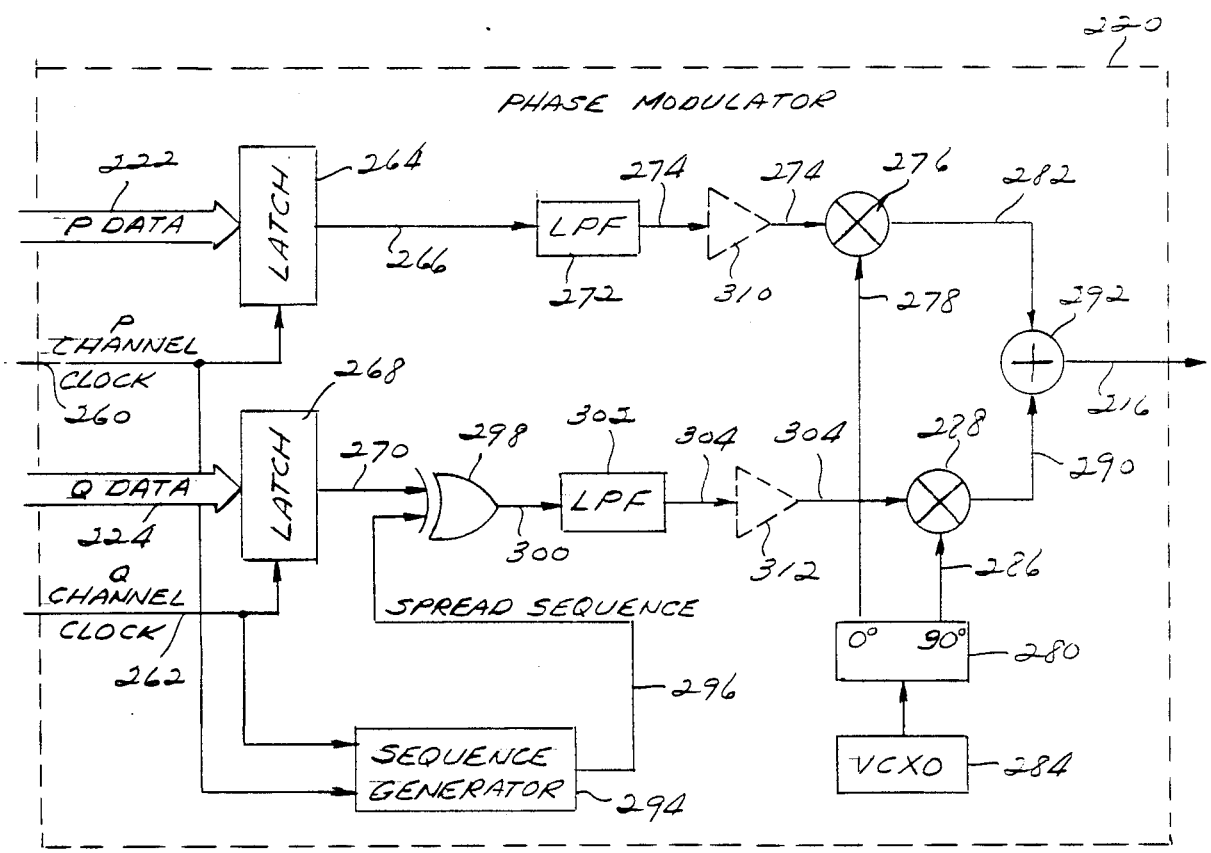
FIG. 5 is a detailed block diagram of an exemplary quadrature phase modulator for use in the transmitting ground station of FIG. 3.
Figure 3:
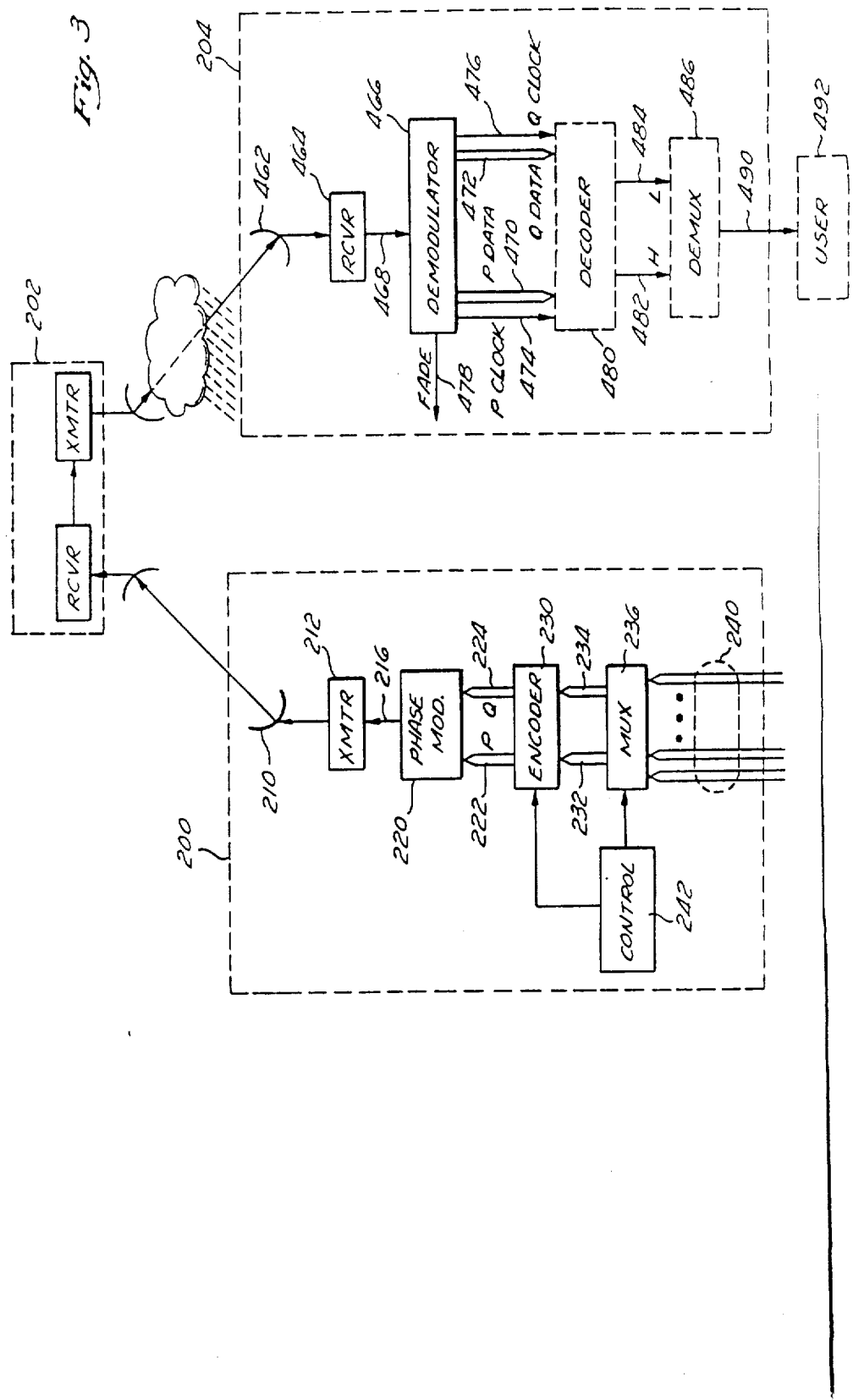
FIG. 3 is a pictorial block diagram of an embodiment of a satellite communication system constructed in accordance with the present invention.
Figure 4A:
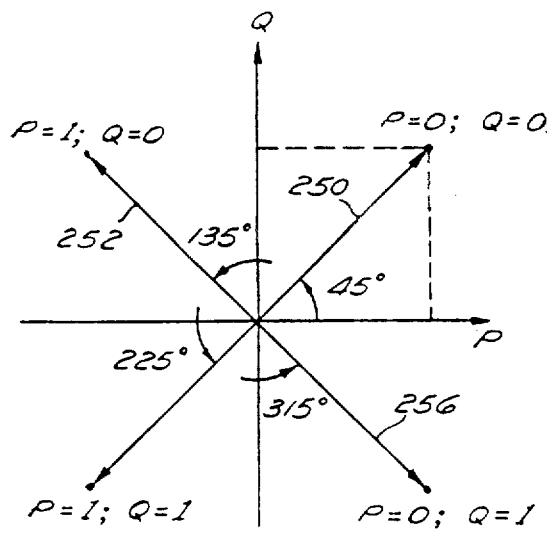
Figure 4B:
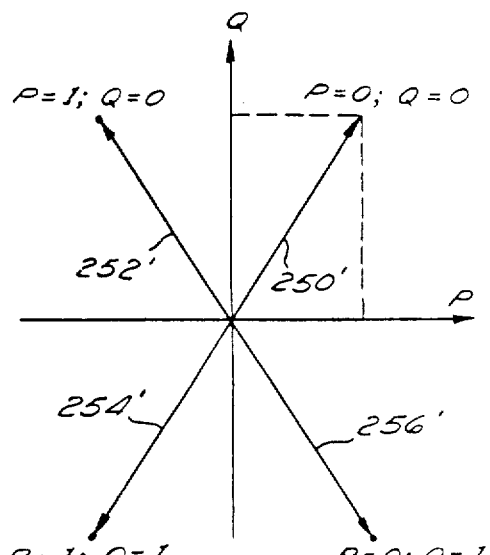
Figure 5:
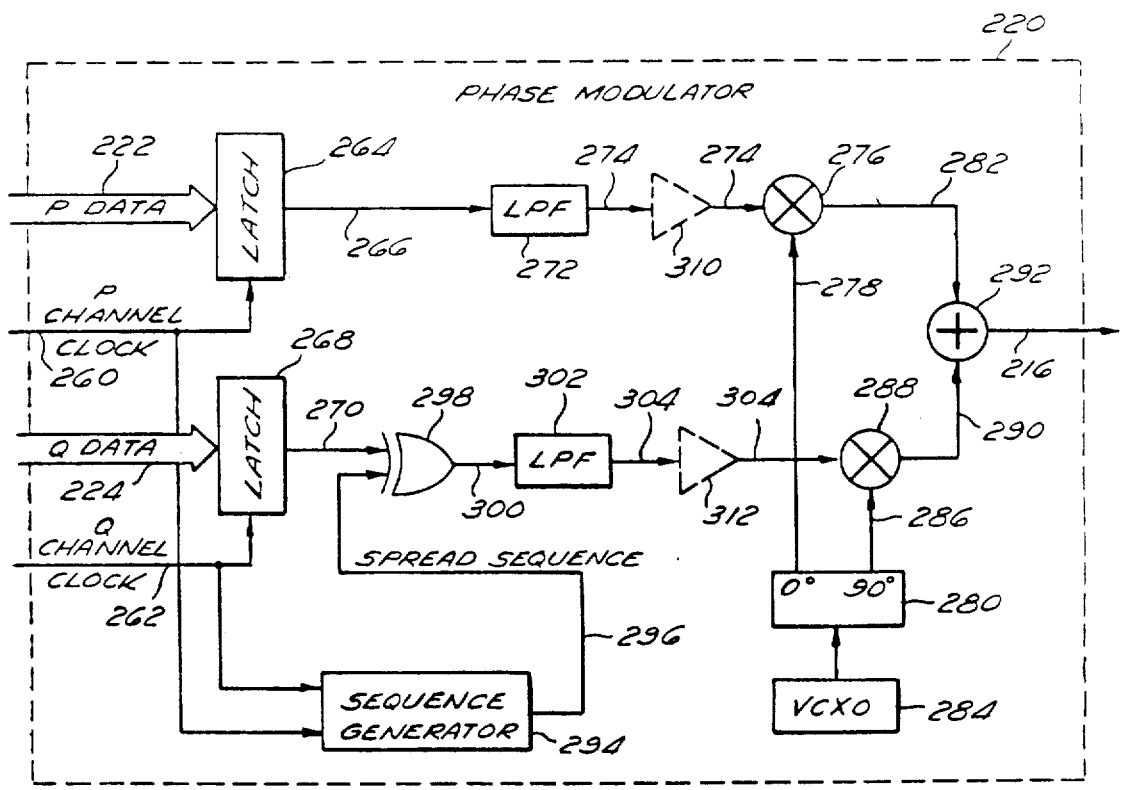
Figure 7:
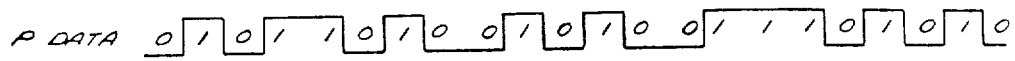
Figure 7:
Figure 7:
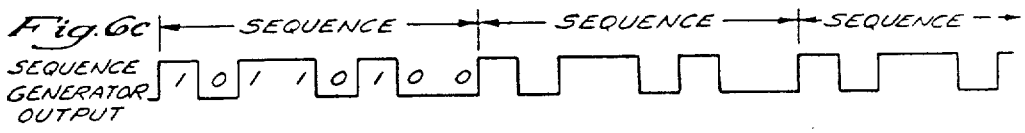
Figure 7:
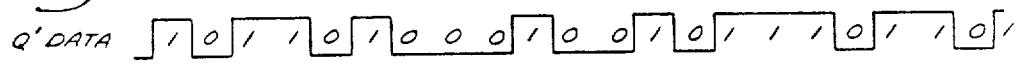
Figure 7:
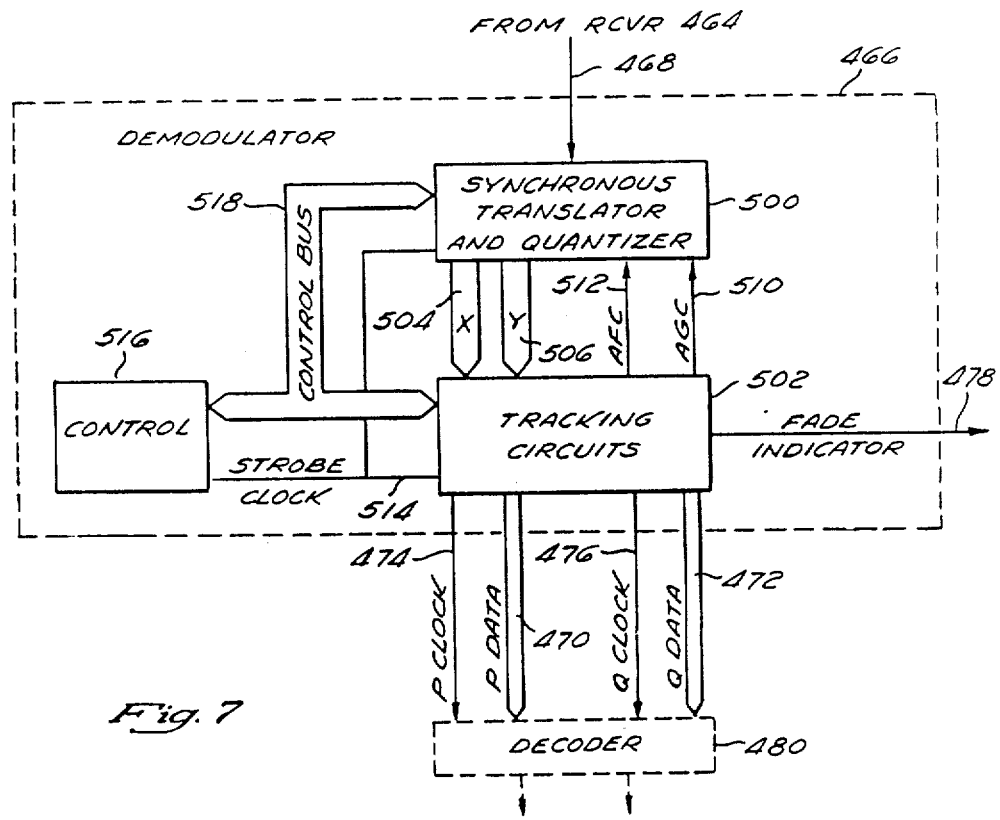
Figure 8:
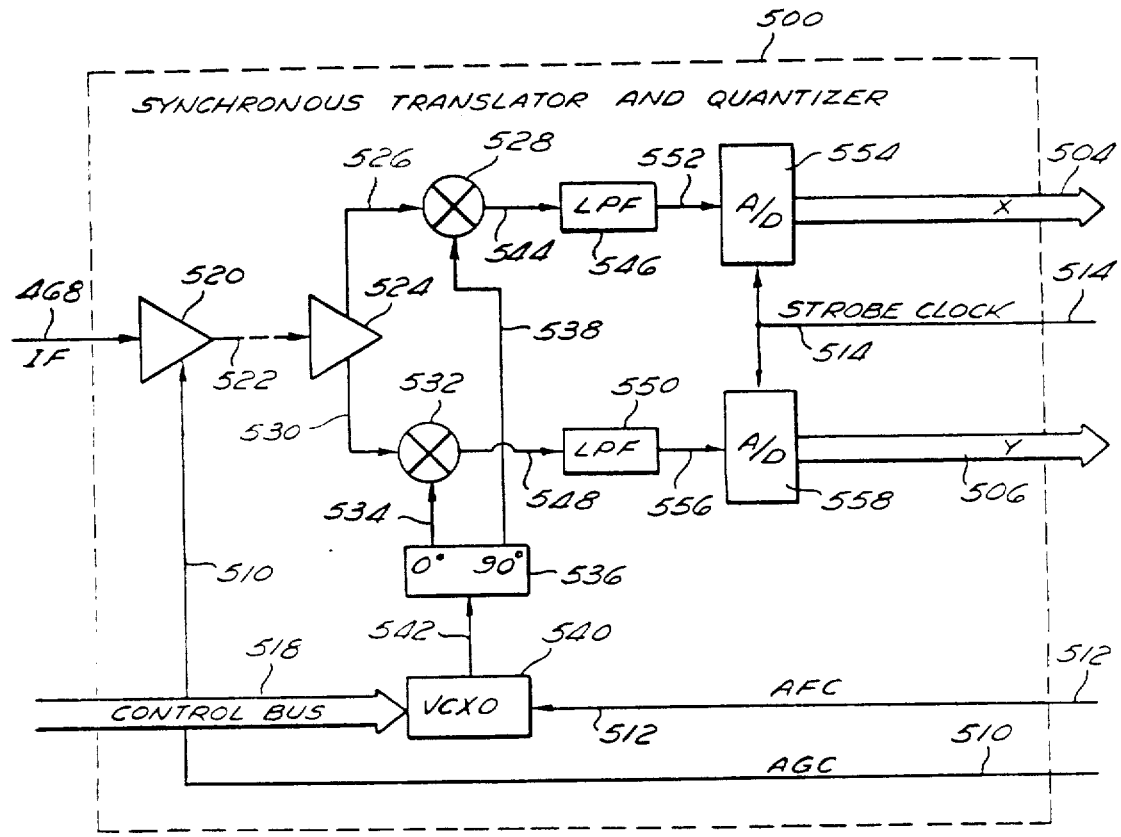
Figure 9:
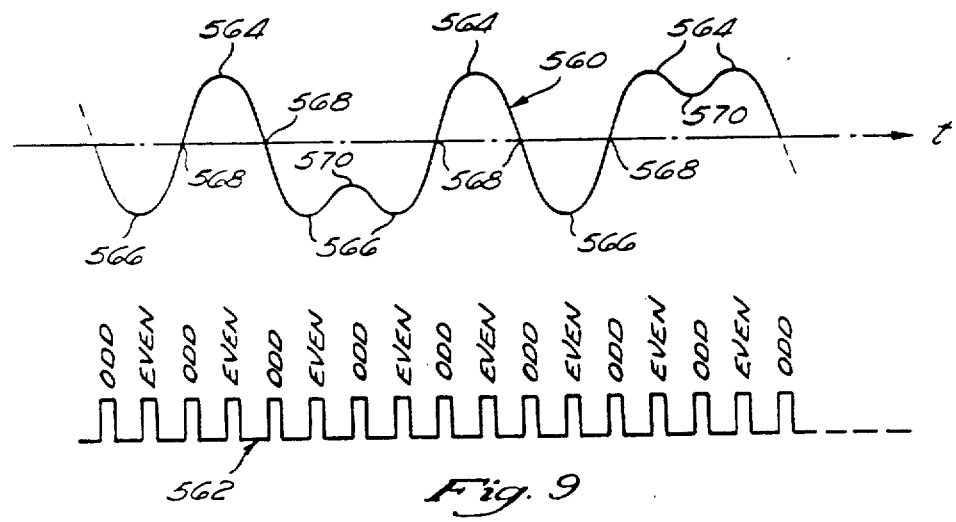
Figure 10:
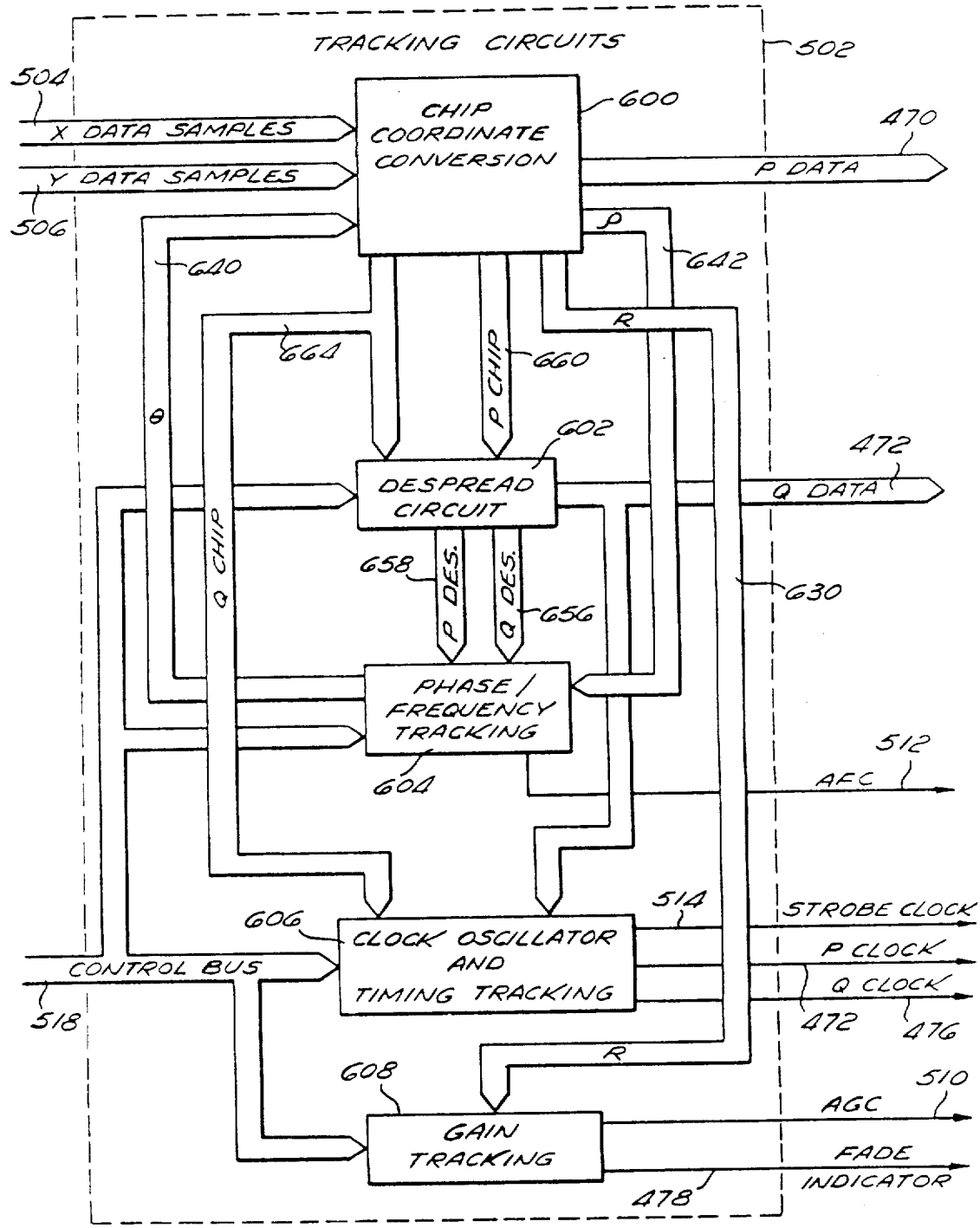
Figure 11:
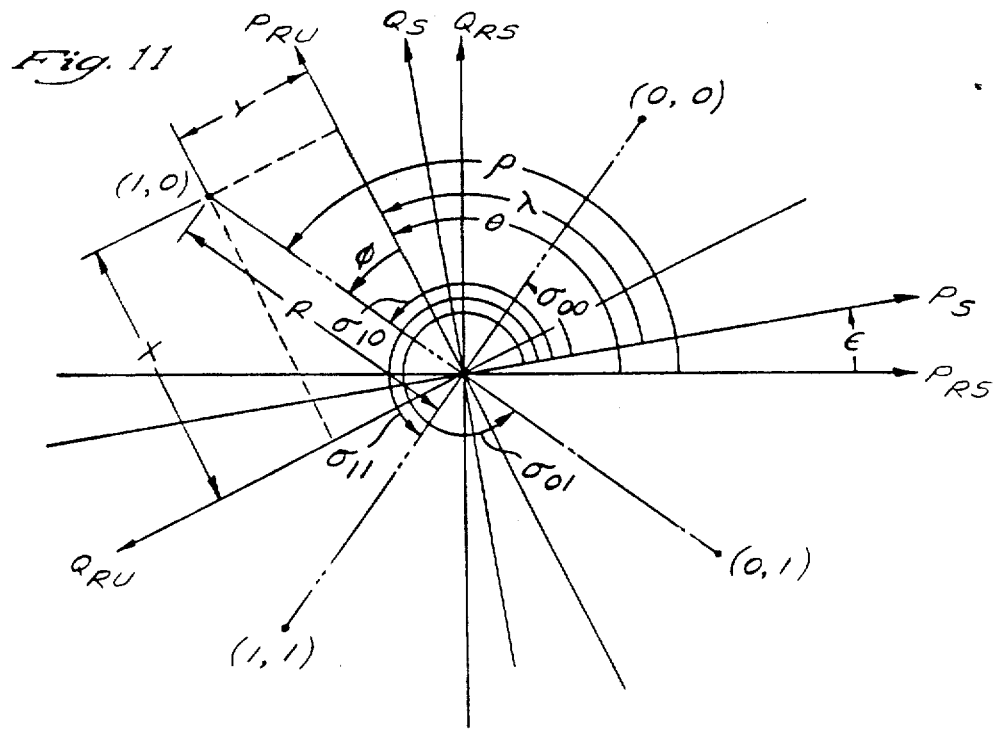
Figure 13:
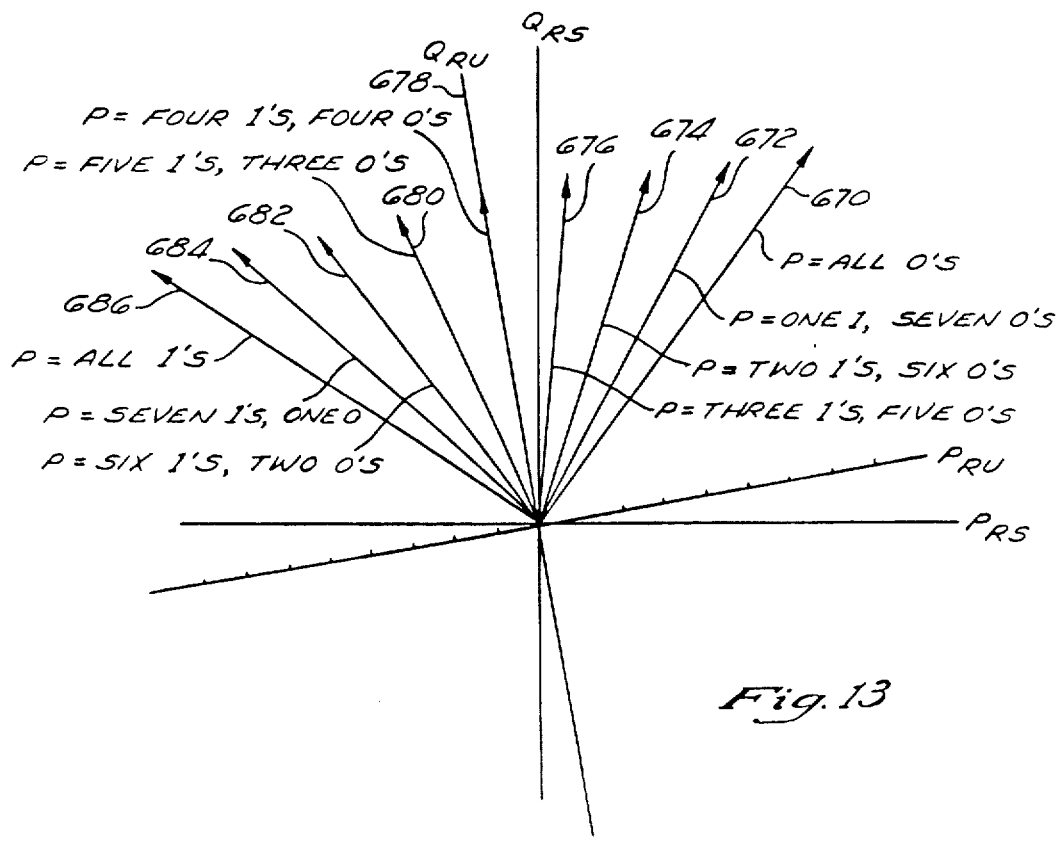
Figure 12:
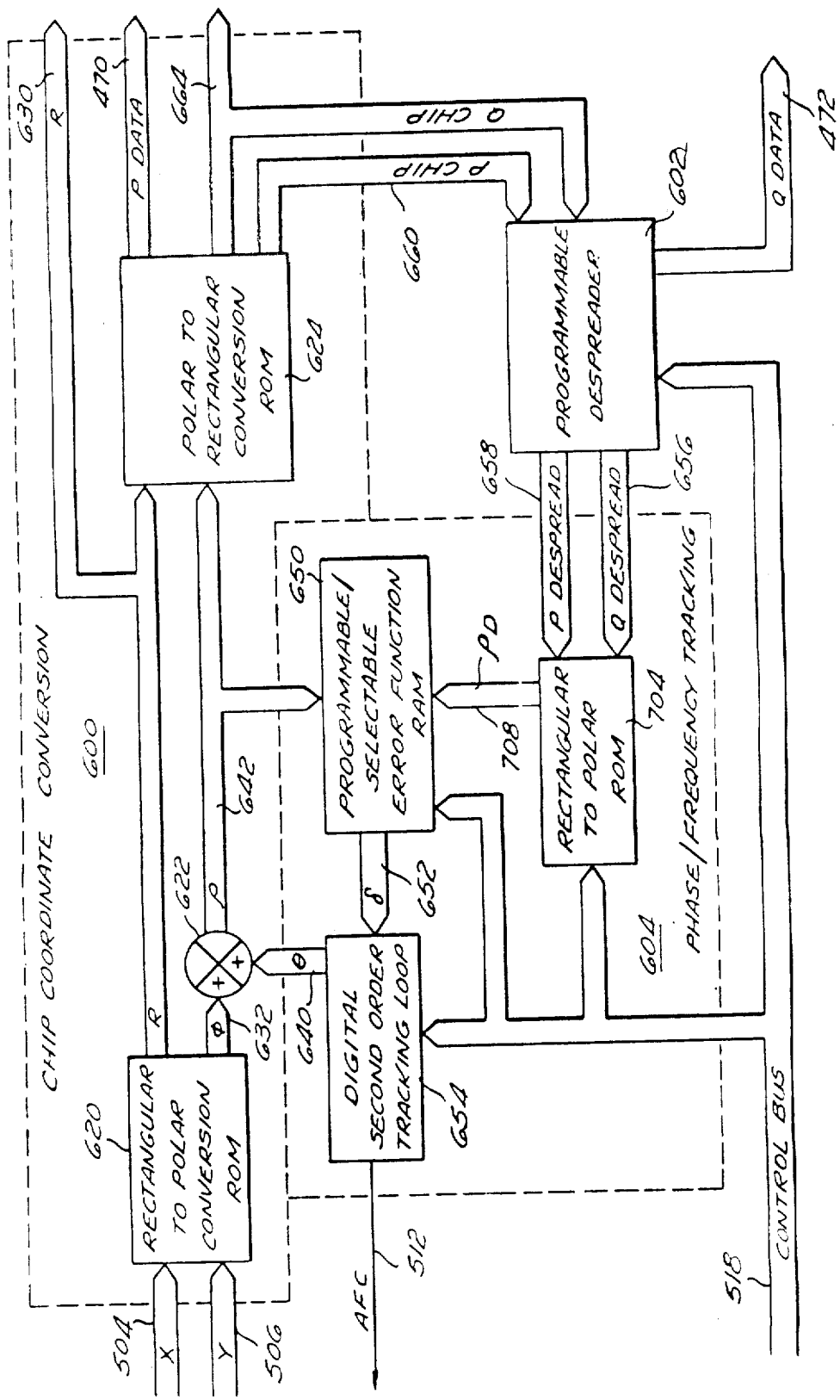
Figure 14:
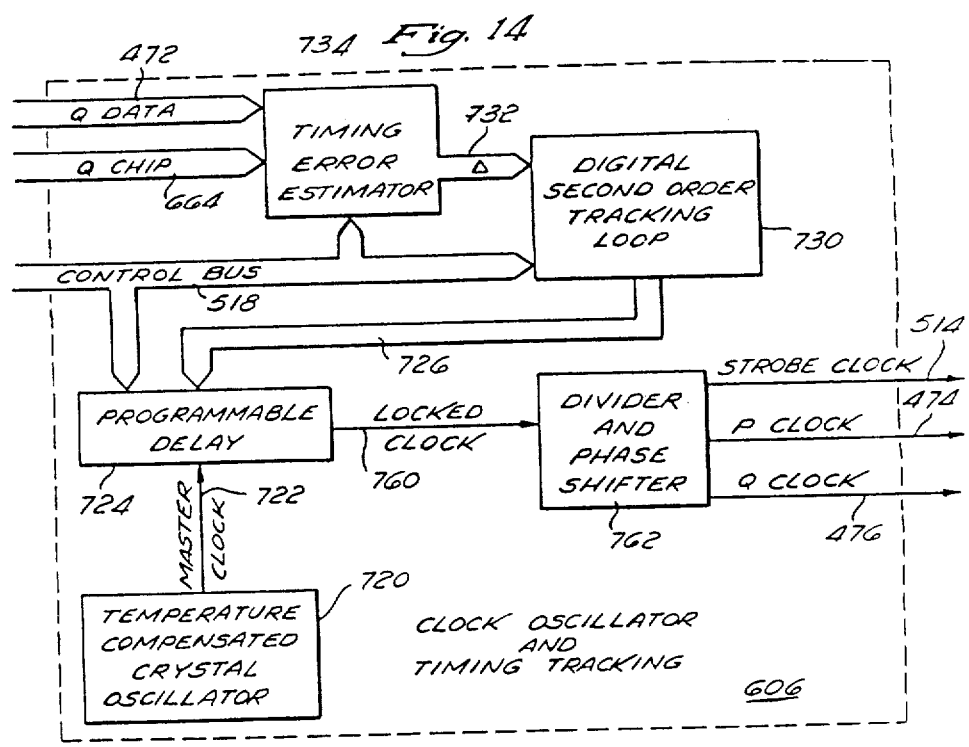
Figure 15:
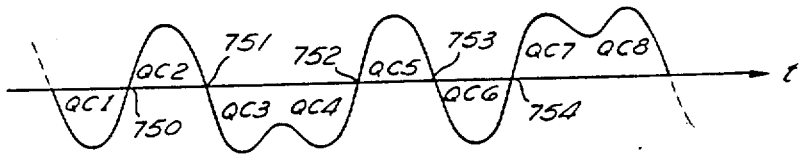
Figure 16:
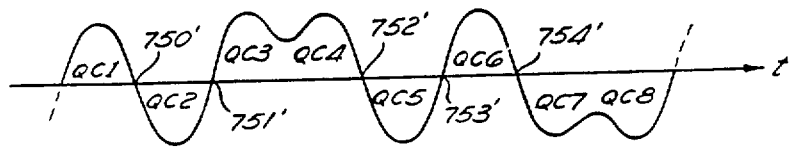
Figure 17A:
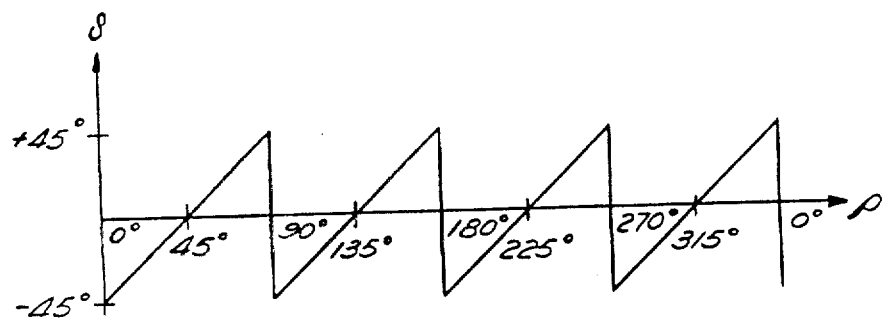
Figure 17B:
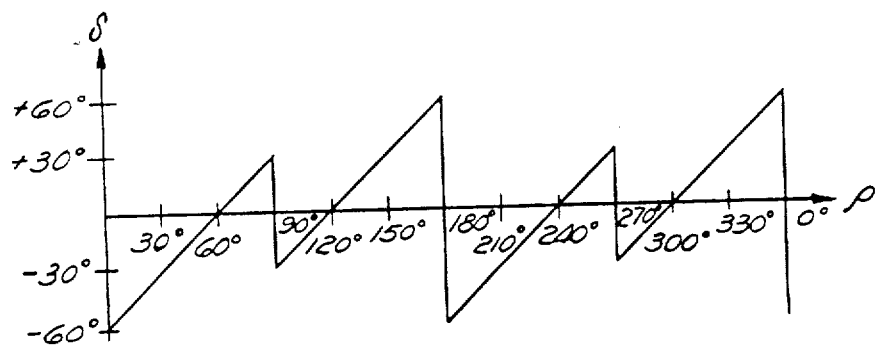
Figure 17C:
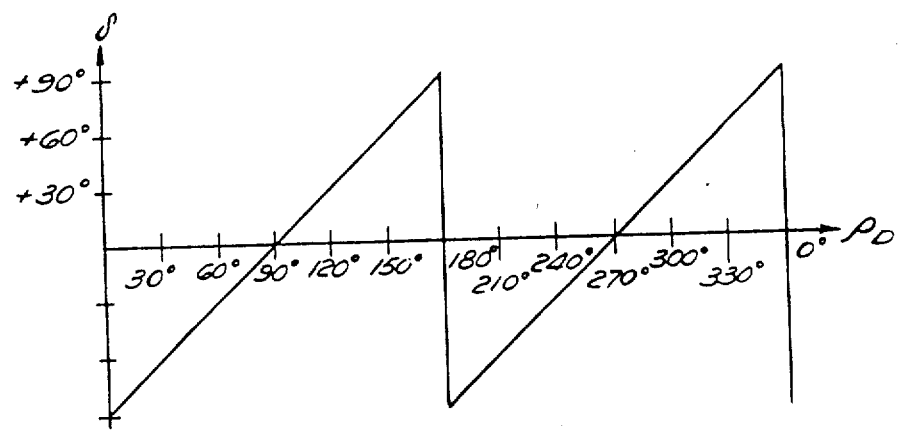

FIG. 3 illustrates a satellite communication system incorporating the apparatus and method of the present invention. The satellite communication system includes a transmitting ground station 200, a conventional satellite 202, and a receiving ground station 204. The transmitting ground station 200 includes a transmitting antenna 210, and a transmitter 212 electrically connected to the antenna 210. The transmitter 212 generates a radio frequency signal at a single frequency in the 14.0-14.5 GHz portion of the Ku band. The transmitter 212 receives a modulated intermediate frequency input in the range of, for example, 70 MHz to 140 MHz on a line 216 from a phase modulator 220. The phase modulator 220, which will be described in additional detail below in connection with FIG. 5 and FIGS. 4a and 4b provides quadrature phase shift modulation of the intermediate frequency signal in response to inputs on a first digital data bus 222 and a second digital data bus 224. For convenience, the first digital data bus 222 will be referred to as the P data bus 222 and the second digital data bus will be referred to as the Q data bus 224. In the present invention, the P data bus 222 operates at a higher data rate than the Q data bus 224. The P data bus 222 and the Q data bus 224 are provided as outputs from an encoder 230. The encoder 230 is provided with inputs on a high speed data bus 232 and a low speed data bus 234 from a multiplexer ("MUX") 236.

The multiplexer 236 receives a plurality of data inputs on a plurality of input buses, collectively identified as a group of input buses 240. The encoder 230 and the multiplexer 236 are controlled by a control block 242 and operate to translate the input data on the input buses 240 into two data streams on the P data bus 222 and the Q data bus 224. For example, the encoder 230, the multiplexer 236 and the control block 242 advantageously operate as a conventional time division multiplexing system wherein a portion of the data on the data input buses 240 is routed to the P data bus 222 at a first data rate and a portion of the data on the data input buses 240 is routed to the Q data bus 224 at a second, lower data rate. The Q data stream on the Q data bus 224 includes frame synchronization and timing information such as was described above in connection with FIG. 2. The data streams are multiplexed and encoded such that the data on the higher data rate P data bus 222 is synchronized with the synchronization information in the Q data stream on the Q data bus 224.

The phase modulator 220 receives the P data and the Q data from the encoder 230 on the P data bus 222 and the Q data bus 224 and generates a phase modulated signal output line 216 at the selected intermediate frequency (e.g., 70 megahertz). In the preferred embodiment, the phase modulator 220 is a quadrature phase modulator which causes a phase shift of the 70 megahertz IF signal that varies in accordance with the P data input and the Q data input. Since the P data input and the Q data input can each assume two binary logical levels (i.e., a binary "1" or a binary "0"), the IF signal can assume one of four phase angles depending upon the four possible combinations of P data and Q data. This is illustrated graphically in FIG. 4a, wherein the horizontal coordinate represents the P data level, with a binary "1" to the right and a binary "0" to the left, and the vertical coordinate represents the Q data level, with a binary "1" to the top and a binary "0" to the left, and the vertical coordinate represents the Q data level, with a binary "1" to the top and a binary "0" to the bottom. When equal power levels are applied to the P channel modulation and the Q channel modulation, a data input combination of the P data input equal to a binary "0" and the Q data input equal to a binary "0" causes a phase shift of 45° with respect to a reference signal of 0°. This is represented by a vector 250. Similarly, a P data input equal to a binary "1" and a Q data input of binary "0" causes 135°, as represented by the vector 252. Similarly, a vector 254 at an angle of 225° represents a P data input of binary "1" and a Q data input of binary "1", and a vector 256 at an angle of 315° represents a P data input of binary "0" and a Q data input of binary "1". Thus, the logic level of the P data and the Q data can be determined by measuring the components of the phase of the transmitted signal with respect to P data and Q data coordinates.

FIG. 4a illustrates the phase modulation when equal modulation power is applied to both the P channel data and the Q channel data so that the components of the phase vectors along both the P data and Q data coordinates are equal. FIG. 4b illustrates an alternate quadrature phase modulation system, wherein the modulation power applied to the Q channel is greater than the modulation power applied to the P channel. In FIG. 4b, the component of each of the phase vectors 250', 252', 254' and 256' along the Q coordinate is greater than the components along the P coordinate. Thus, more of the modulation power is applied to the Q data modulation so that the Q data is more easily discriminated in the presence of attenuation and background noise. Thus, in an exemplary satellite communication system wherein only a limited amount of power is allocated to each user, a user can allocate differing amounts of power to the modulation of the Q channel data and the P channel data in accordance with the desired signal-to-noise ratio.

FIG. 5 illustrates a block diagram of the modulator 220, showing additional details of its structure. As set forth above, the modulator 220 receives the P data input on the P data bus 222 and the Q data input on the Q data bus 224. The modulator 220 also receives a P channel clock signal on a line 260 and a Q channel clock signal on a line 262. In the embodiment described, the P channel clock and the Q channel clock will have frequencies proportional to the respective data rates and are generated by the encoder 220. In particular, if the P channel data rate is N times the Q channel data rate, the P channel clock on the line 260 will have a frequency that is N times the Q channel frequency and thus N times the frequency of the Q channel clock on the line 262. For example, the P channel may advantageously operate at 64,000 bits per second while the Q channel operates at 8,000 bits per second, in which case N is equal to 8. The P data input on the P data bus 222 is gated into a P channel latch 264 and is then provided as a P data serial output signal on a line 266. Similarly, the Q data input on the Q data bus 224 is gated into a Q channel latch 268 and is then provided as a Q data serial output signal on a line 270 at a rate of 1/N times the rate of the P data serial output on the line 266. The P data serial output on the line 266 is further processed and is provided as an input to a P channel low pass filter 272 to reduce the high frequency content of the P data. The output of the P channel low pass filter on a line 274 is provided as an input to a P channel quadrature mixer 276 and is mixed with a clock signal on a line 278 from a clock generator 280 to provide an output signal on a line 282 at the intermediate frequency (e.g., 70 MHz). The clock generator 280 has an input from an oscillator 284 and provides two outputs, a first clock output on the line 278 and a second clock output on a line 286. The second clock output on the line 286 is shifted in phase by 90° from the first clock output and is provided as an input to a Q channel quadrature mixer 288. The Q channel quadrature mixer 288 provides an output signal on a line 290 at the intermediate frequency that may be shifted in phase from the output signal on the line 282 from the P channel quadrature mixer 276. The signals on the line 282 and the line 290 are combined in a mixer 292 to produce the modulator output signal on the line 216 at the intermediate frequency. As set forth above, the intermediate frequency output on the line 216 is shifted in phase in accordance with the data inputs on the P data input bus 222 and the Q data input bus 224.

Although the P data path and the Q data path in the modulator 220 could be substantially similar, the present invention includes compensation for the reduced bandwidth of the Q data channel. One skilled in the art will recognize that since the Q data rate is much lower than the P data rate, the bandwidth of the output signal caused by the Q data will be much narrower than that caused by the P data. It is preferable that the signal generated by the transmitter 212 (FIG. 3) occupy a substantial part of the allocated bandwidth, rather than being concentrated near the center frequency of the transmitter carrier. Thus, the modulator 220 of FIG. 5 further includes means for spreading the Q channel signal to occupy a greater portion of the allocated bandwidth. A sequence (or pattern) generator 294 is driven by the P channel clock on the line 260, and is synchronized with the Q channel clock on the line 262. It generates a repeating sequence of data that is provided on an output line 296. This data sequence is generated at the P channel data rate and is provided as one input to an exclusive-OR circuit 298. A second input to the exclusive-OR circuit 298 is the Q data serial output from the Q data latch on the line 270. The exclusive-OR circuit 298 provides a spread Q data output on a line 300 that may be further processed and then provided as an input to a Q data low pass filter 302. The output of the Q data low pass filter is provided as input to the Q channel quadrature mixer on a line 304.

Figure 6C:
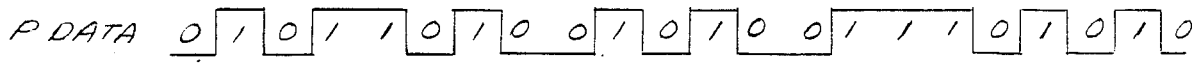
Figure 6C:
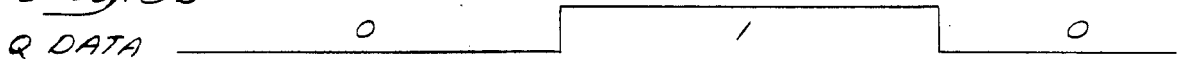
Figure 6C:
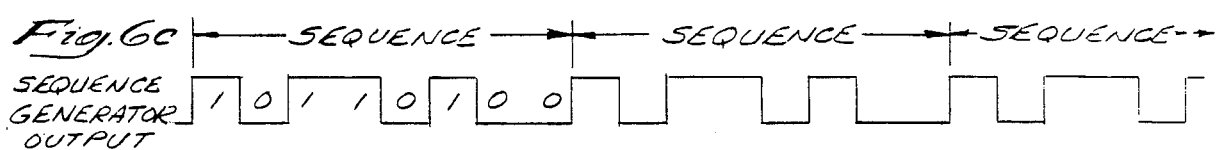

The operation of the sequence generator 294 and the exclusive-OR circuit to spread the bandwidth of the Q channel data is illustrated in FIGS. 6a–d. FIG. 6a channel illustrates an exemplary P data sequence of binary "0101101001010011101010..." on the line 266. FIG. 6b illustrates the beginning of the same sequence for the Q channel on the line 270. As illustrated, the Q data (FIG. 6b) has a rate that is ⅛th the rate of the P data (FIG. 6a). An exemplary sequence on the line 296 from the sequence generator 294 is illustrated in FIG. 6c. The exemplary sequence is "10110100" and repeats at the Q channel data rate. When the sequence of FIG. 6c is applied to the exclusive-OR circuit 298 and is thereby exclusive-OR'd with the Q data on the line 270, the exclusive-OR circuit 298 provides an output on the line 300, as illustrated in FIG. 6d, that has the same data rate as the P data. A logical "1" on the Q data is represented by the sequence "01001011" and a logical "0" is represented by the complementary sequence "10110100". Thus, the Q channel data is spread, while maintaining the ability to distinguish a Q data "1" from a Q data "0".

As further illustrated in FIG. 5, the phase modulator 220 may advantageously include an adjustable amplifier 310 (shown in phantom) in the line 274 between the P channel low pass filter 272 and the P channel quadrature mixer 276 to vary the amount of modulation (i.e., phase shift) in the IF output signal responsive to the P data input on the line 274. Similarly, an adjustable amplifier 312 (shown in phantom) may be included in the line 304 between the Q channel low pass filter 302 and the Q channel quadrature mixer 288 to vary the amount of modulation responsive to the Q data input on the line 304. The effect of the variation in the magnitude of the respective P channel and Q channel modulation was discussed above in connection with FIGS. 4a and 4b.

The operation of the control logic 242, the multiplexer 236, and the encoder 230 in providing this time division multiplexing function is well known in the art and will not be described in detail herein. Typically, the control logic 242 includes a microprocessor (not shown) and associated control memory (not shown) to provide the functions to control the encoder 230 and the multiplexer 236. The selection of the signals on the data input buses 240 to be enabled to the multiplexer 236 at any given time is a function of network demand and varies as the network demand varies. In addition, as will be discussed below, the routing of the data to either the P data bus 222 or the Q data bus 224 is a function of the priority or urgency of the data in a broadcast system, or a function of the destination in an addressed system. These two functions will be discussed more fully below.

The use of the quadrature phase shift modulator 220 provides a means for encoding the P data stream and the Q data stream on the same intermediate frequency (e.g., 70 megahertz) on the line 216 that is provided as the input to the transmitter 212. Although transmitted on the same frequency, the two data streams do not interact. Thus, the P data stream and the Q data stream can be considered as two separate channel inputs to the phase modulator 220. The present invention uses the two channels as two separate transmission paths from the transmitting ground station 200 to a receiving ground station 204.

The transmitter 212 mixes the phase modulated intermediate frequency on the line 216 with a frequency in the range of 14.0–14.5 GHz and generates a signal that is transmitted via the transmitting antenna 210 towards the satellite 202. The satellite 202 is advantageously a conventional satellite that includes a number of transponders that receive signals in the 14.0–14.5 GHz frequency range from a plurality of transmitting ground stations, such as the ground station 200, and retransmit the received signals towards the ground at frequencies in the range of 11.7–12.2 GHz to be received by a plurality of receiving ground stations, such as the ground station 204. Thus, for the purpose of the present invention the satellite 202 serves as a frequency translating relay between the transmitting ground station 200 and the receiving ground station 204.

The receiving ground station 204 includes a ground station receiving antenna 462, ground station receiver 464, and a demodulator 466. The ground station receiving antenna 462 is directed toward the satellite 202 so that the receiving antenna 462 receives the signals transmitted by the satellite 202. The receiving antenna 462 is electrically connected to the ground station receiver 464. The ground station receiver 464 receives the signals from the receiving antenna 462 and converts the received signals to an output signal on a line 468 at an intermediate frequency of 70 megahertz, or the like. The output signal from the receiver 464 on the line 468 is provided to the demodulator 466. The demodulator 466 performs the opposite function to the phase modulator 220 in the transmitting ground station 200. The demodulator 466 converts the phase encoded intermediate frequency from the receiver 464 into a reconstructed P signal output on a P data bus 470 and a reconstructed Q signal output on a Q data bus 472. The demodulator 466 further provides a P clock output on a line 474 and a Q clock output on a line 476. The P clock output on the line 474 provides a means of synchronizing the P data on the P data bus 470. Similarly, the Q clock output on the line 476 provides a means for synchronizing the Q data on the Q data bus 472. The demodulator 466 further provides an output signal on a line 478 that indicates the strength of the received signal. In particular, the output signal on the line 478 provides an indication of the strength of the reconstructed P signal on the P data bus 470 in the receiving ground station 204.

The P data on the P data bus 470, the Q data on the Q data bus 472, the P clock on the line 474, and the Q clock on the line 476, are provided as inputs to a decoder 480, shown in phantom. The operation of the decoder 480 is conventional and will not be described in detail herein. Basically, the decoder 480 converts the P data on the P data bus 470 into a high speed data stream on a line or bus 482 and converts the Q data on the Q data bus 472 into a low speed data stream on a line or bus 484. The high speed data bus 482 and the low speed data bus 484 are provided to a demultiplexer 486, also shown in phantom. The output of the demultiplexer 486 is provided on a line or bus 490 to user equipment represented by a block 492. The decoder 480, the demultiplexer 486, and the user equipment 492 can be any of a number of conventional devices that decode the time division multiplexed signals on the P data bus 470 and on the Q data bus 472 and convert them to local signals in a parallel or serial signal format. For example, the decoder 480 and the demultiplexer 486 are advantageously constructed to synchronize with the incoming data on the P data bus 470 and on the Q data bus 472. They perform this function by recognizing the frame synchronization pattern at the beginning of each frame of incoming data and then using the P clock on the line 474 to count the time from the beginning of the frame on the P channel, and using the Q clock on the line 476 to count the time from the beginning of the frame on the Q channel. The decoder 480 and the demultiplexer 486 respond to a selected time slot in each frame of data provided on the P data bus 470 and provide a signal output in a selected format on the bus 490 to the user 492 having data information corresponding to the data in the selected time slot. Alternatively, the decoder 480 and the demultiplexer 486 can be adjusted to select one of the time slots on the Q data bus 472 and provide the data in selected time slot on the bus 490 to the user 492. Although the decoder 480 is shown as one decoder, the decoder 480 can advantageously comprise a separate decoder for each of the P and Q channel data streams.

Figure 7:
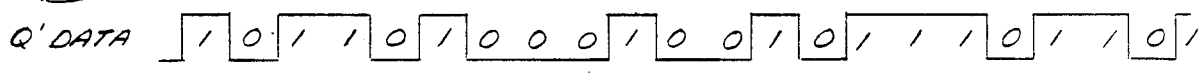
FIG. 7 is a block diagram of a preferred embodiment of the demodulator in the receiving ground station of FIG. 3.
Figure 7:
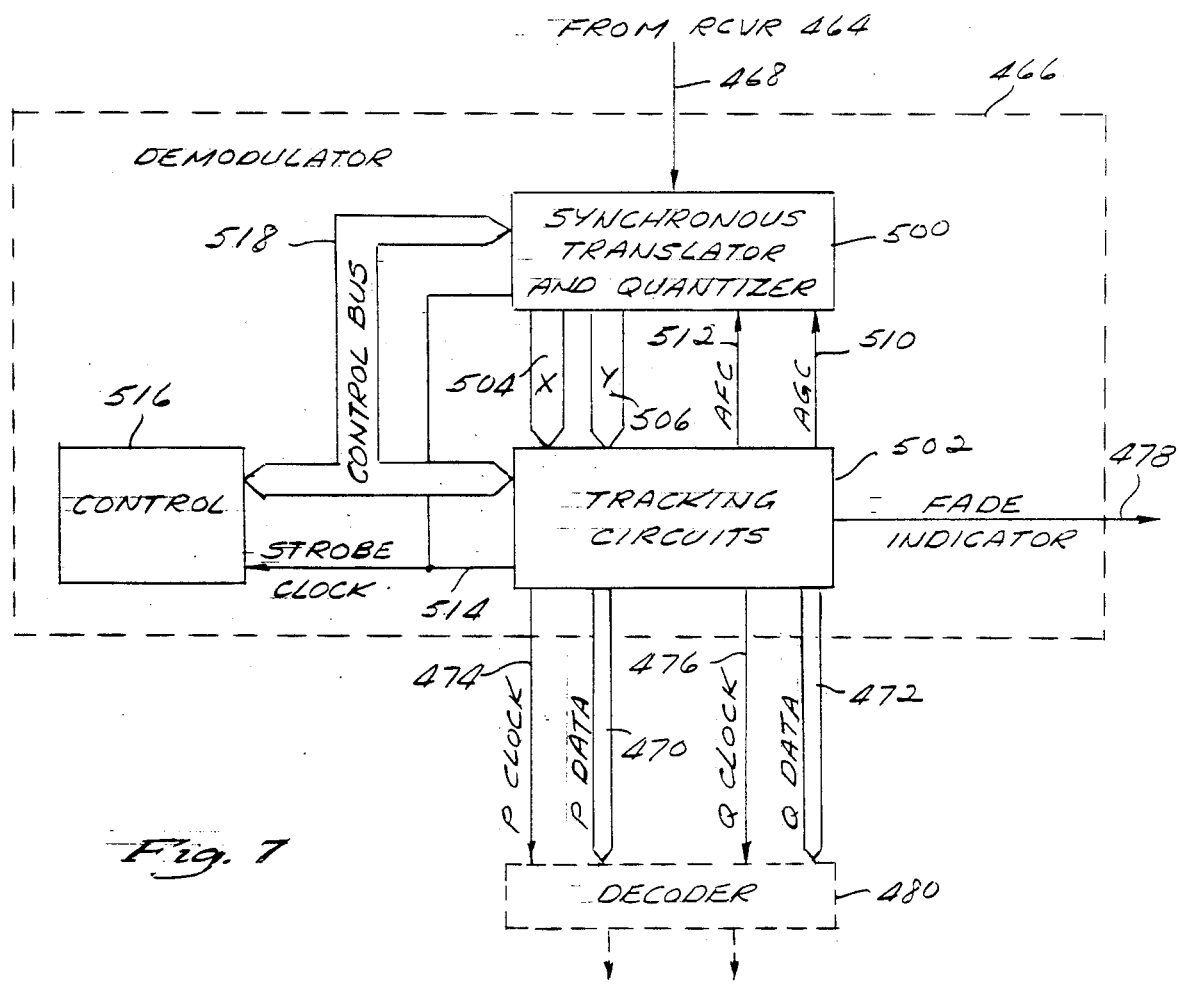

Additional details of the demodulator 466 of FIG. 3 are shown in FIG. 7. The demodulator 466 includes a synchronous translator and quantizer block 500 and a tracking circuit block 502. The synchronous translator and quantizer block 500 receives the intermediate frequency signal on the line 468 from the receiver 464 in FIG. 3, and generates an X data output on an X data bus 504 and a Y data output on a Y data bus 506. The X data bus 504 and the Y data bus 506 are provided as inputs to the tracking circuits block 502. The tracking circuits block 502 is responsive to the data input on the X data bus 504 and the Y data bus 506 and generates the P data output on the P data bus 470, the P clock output on the line 474, the Q data output on the Q data bus 472, the Q clock output on the line 476, and the fade indicator output on the line 478. The tracking circuits block 502 further provides feedback to control the synchronous translator and quantizer block 500 on an automatic gain control ("AGC") line 510, an automatic frequency control ("AFC") line 512, and a strobe clock line 514. The synchronous translator and quantizer block 500 and the tracking circuits block 502 are controlled by a control block 516 via a control bus 518. The control block 516 advantageously includes a microprocessor which issues commands to and receives status indicators and other data from the synchronous translator and quantizer block 500 and the tracking circuits block 502 on the control bus 518. Additional details of the synchronous translator and quantizer block 500 and the tracking circuits block 502 are provided below.

Figure 8:
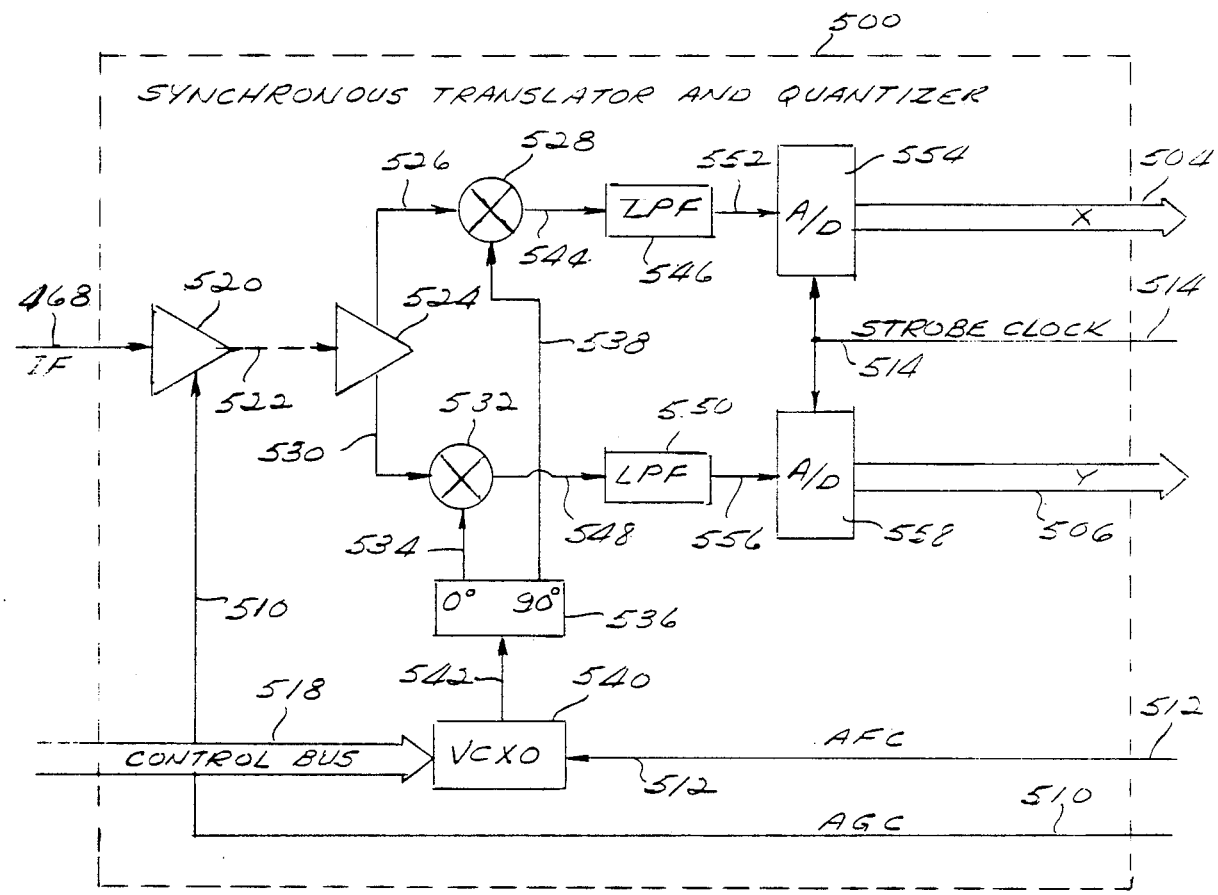
FIG. 8 is a detailed block diagram of the synchronous translator and quantizer in the demodulator of FIG. 7.

The synchronous translator and quantizer block 500 is shown in more detail in FIG. 8. It includes a controlled gain input amplifier 520 which receives the intermediate frequency (IF) signal on the line 468. The gain of the input amplifier 520 is controlled by the automatic gain control (AGC) signal on the line 510. The output of the input amplifier 520 on a line 522 is provided as an input to a power splitter 524 that provides a signal on a line 526 to a P channel quadrature mixer 528 and an equivalent signal on a line 530 to a Q channel quadrature mixer 532. The Q channel quadrature mixer 532 is driven by a local oscillator signal on a line 534 from a phase splitter 536. The P channel quadrature mixer 528 is driven by a local oscillator signal on a line 538 from the phase splitter 536. The phase splitter 536 is driven by the output of a controllable oscillator 540 on a line 542. The controllable oscillator 540 is preferably a voltage controlled crystal oscillator controlled by the automatic frequency control (AFC) signal on the line 512. The local oscillator signal on the line 538 differs in phase by 90° from the local oscillator signal on the line 534. The P channel quadrature mixer 528 provides an output signal on a line 544 to a P channel low pass filter 546, while the Q channel quadrature mixer 532 provides an output signal on a line 548 to a Q channel low pass filter 550.

Figure 9:
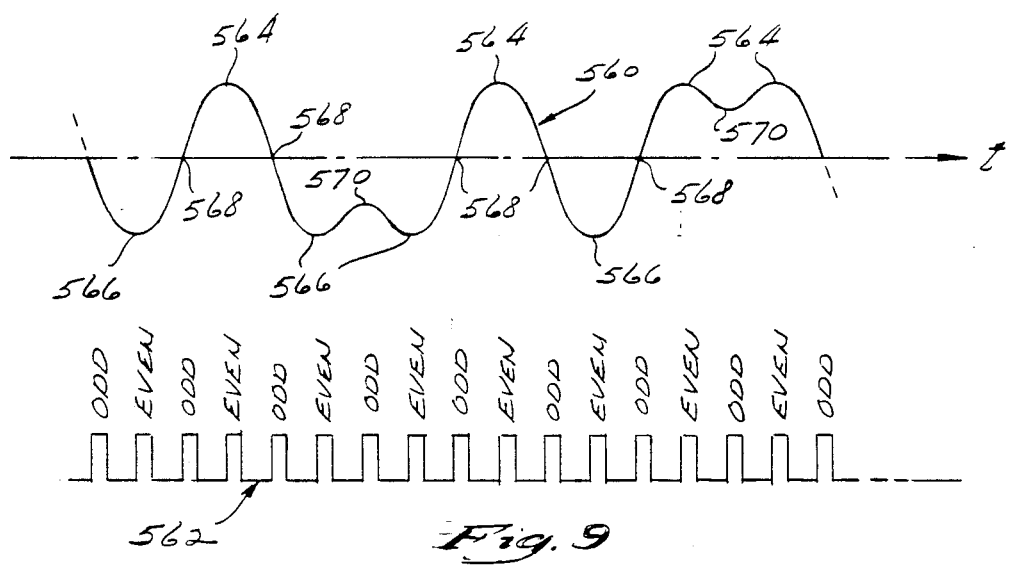
FIG. 9 is a graphical representation of the chip symbol data stream and the strobe clock showing the preferred timing relationship between the strobe clock and the peaks and nulls of the chip data stream.
Figure 10:
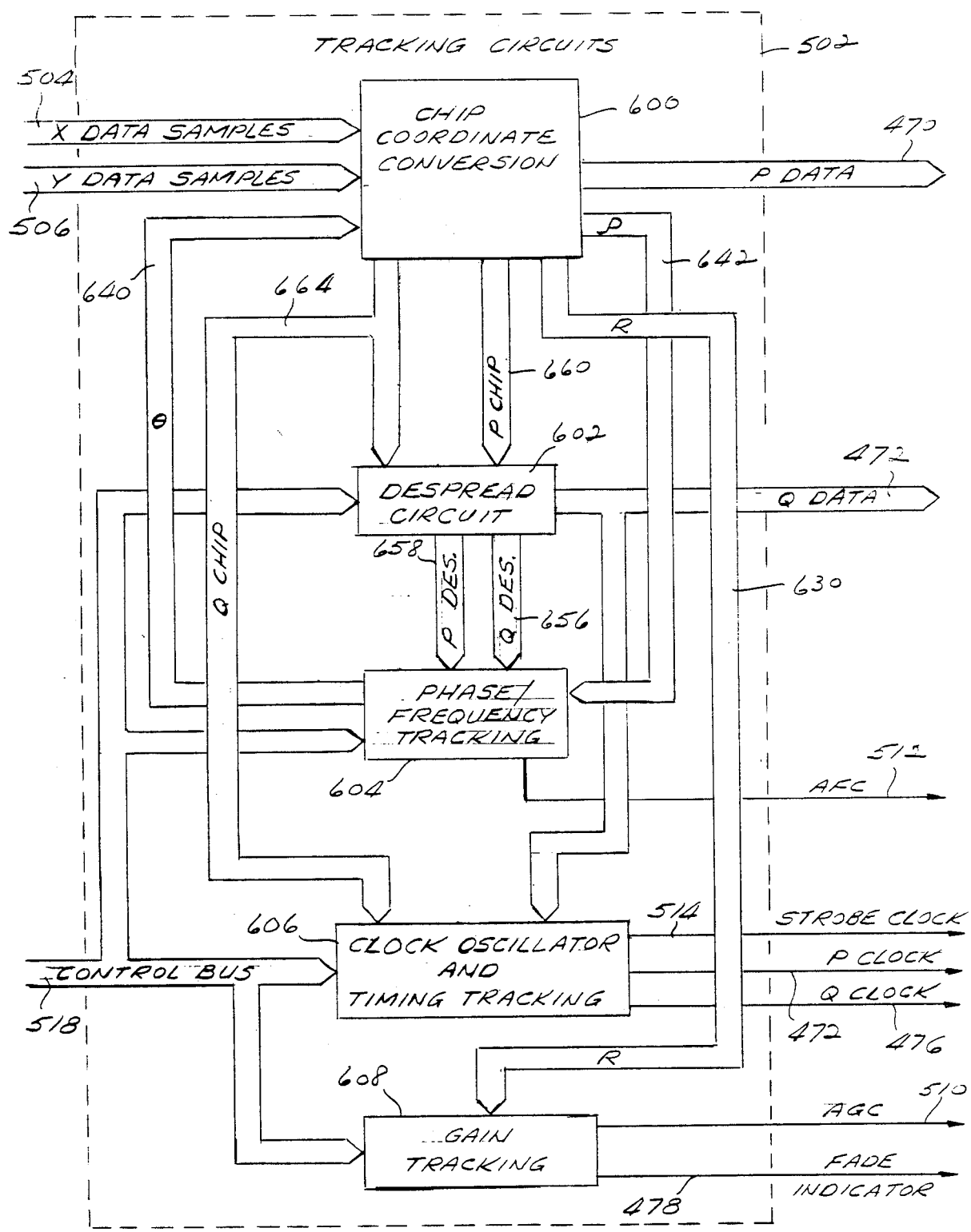
FIG. 10 is a detailed block diagram of the tracking circuits in the demodulator of FIG. 7.

The output of the P channel low pass filter 546 is provided on a line 552 to a P channel quantizer (i.e., analog-to-digital convertor) 554, and the output of the Q channel low pass filter 550 is provided on a line 556 to a Q channel quantizer 558. The P channel quantizer 554 and the Q channel quantizer 558 are driven by the strobe clock on the line 514. The strobe clock on the line 514 operates at a frequency that is twice the P channel data rate (i.e., at twice the chip rate) so that two samples each are taken of the P channel data and the Q channel during each chip symbol period. This is illustrated in FIG. 9, wherein an exemplary chip symbol waveform is represented by a graph 560 and the strobe clock is represented by a graph 562. Each chip symbol comprises a positive peak 564 or a negative peak 566 between two adjacent nulls 568 or 570. The nulls 568 correspond to transitions between a positive peak 564 and a negative peak 566 and to transitions between a negative peak 566 and a positive peak 564 and have a substantially zero magnitude. The nulls 570 correspond to transitions between two adjacent positive peaks 564 or between two adjacent negative peaks 566 and thus have the same polarity as the adjacent peaks 564 or 566. The nulls 570 have non-zero magnitudes that are less than the magnitude of either of the adjacent peaks. The strobe clock 562 on the line 514 is preferentially adjusted to provide an odd sample strobe at a null 568 or 570 that appears between each chip symbol peak 564, 566 and to provide an even sample at the positive peak 564 or the negative peak 566 of each chip symbol.

Returning to FIG. 8, the digitized representation of the peaks and the nulls are provided on the X bus 504 and the Y bus 506 from the P channel quantizer 554 and the Q channel quantizer 558, respectively, and are thus provided as outputs from the synchronous translator and quantizer block 500 to the tracking circuits block 502 (FIG. 7). The baseband components (i.e., the chip data rate components) of the resultant signals on the line 504 and the line 506 comprise a time-varying, trigonometrically weighted combination of the transmitted P and Q signals due to residual frequency difference between the oscillator 540 and the incoming intermediate frequency signal on the line 468. The relationship of the signals on the lines 504 and 506 and the P and Q signals transmitted by the transmitting ground rotation 200 is discussed below in connection with FIG. 11.

The center frequency of the controllable oscillator 540 in the synchronous translator and quantizer block 500 is controlled by the control bus 518 from a control block 516 (FIG. 7). In operation, the control block 516 will set the center frequency of the oscillator 540, and the AFC signal on the line 512 from the tracking circuits block 502 will fine tune the frequency to bring it within a small difference from the intermediate frequency of the transmitter 212 in the transmitting ground station 200.

The control block 516 also establishes the sequence of operations for the tracking circuits block 502 and the synchronous translator and quantizer block 500, and monitors the outputs of the tracking circuits block 502 and the synchronous translator and quantizer block 500 to ensure that each is operating correctly. When the system of the present invention is first enabled and thus has not yet acquired and synchronized with the signal from the satellite 300 (FIG. 3), the control block 516 initiates an acquisition procedure wherein the tracking circuits block 502 operates in a mode that treats each chip symbol independently until preliminary phase lock is achieved. In other words, the tracking circuits do not attempt to decode the chip symbols into either P data or Q data. During the acquisition period, the control block 516 causes the demodulator 466 to search for the carrier center frequency by sending frequency selection signals to control the controllable oscillator 540 within the synchronous translator and quantizer block 500.

When initial phase lock is achieved, the control block 516 initiates an alignment procedure within the tracking circuits block 502 o cause a despreading sequence in the tracking circuits to come into alignment with the spreading sequence of the sending circuit (i.e., the spreading sequence of the phase modulator 220 in the transmitting ground station 200). When these two preliminary acquisition processes have been completed, the control block 516 sends commands to the tracking circuits block 502 to cause the tracking circuits block 502 to enter the tracking mode, which will be discussed in more detail below. After phase tracking has been stabilized, the control block 516 initiates a series of bandwidth reductions in a phase tracking loop in the tracking circuits block 502 to prepare for reliable phase tracking under possible deep fading conditions, which may occur thereafter.

Once these preliminary functions have been accomplished, the control block 516 enters into a monitoring procedure. Until such time as a loss of tracking occurs, the control block 516 does not send any commands to the synchronous translator and quantizer block 500 or the tracking circuits block 502. Rather, the control block 516 only monitors the operation of the tracking circuits block 502. In the event of loss of tracking, the control block 516 will initiate an acquisition sequence such as the initial acquisition sequence when the system is first enabled. The control block 516 communicates with the synchronous translator and quantizer 500 and the tracking circuits block 502 via the control bus 518.

Within the tracking circuits block 502, all essential demodulation tracking is executed and both the P channel and Q channel signals are extracted from the input samples on the X bus 504 and the Y bus 506 and are provided as output signals on the P data bus 470 and the Q data bus 472, respectively to the decoder circuit 480. The tracking circuits block 502 provides carrier phase tracking, automatic frequency control signal generation, automatic gain control signal generation, chip time tracking and clock generation, removal of the Q channel spreading sequence, generation of the P and Q data output streams on the buses 470 and 472, respectively, and the initial acquisition procedures discussed above. The X sample inputs on the X bus 504 and the Y sample inputs on the Y bus 506 from the synchronous translator and quantizer block 500 are provided at a rate that is twice the chip rate. Thus, in the preferred embodiments, wherein the P channel operates at the chip rate, the outputs of the two quantizers are provided at twice the P channel data rate. As well as providing the P data output on the P data bus 470 and the Q data output on the Q data bus 472, the tracking circuits block 502 also provides the P clock on the line 474, and the Q clock on the line 476. In addition, the tracking circuits block 502 provides the fade indicator on the line 478, as discussed above.

FIGS. 10, 11, 12, and 13 provide additional details of the tracking circuits block 502. The tracking circuits block 502 include five functional blocks which carry out the tracking activities. The functional blocks within the tracking circuits block 502 include a chip coordinate conversion block 600, a despread circuit block 602, a phase/frequency tracking block 604, a clock oscillator and timing tracking block 606 and a gain tracking block 608. The digitized samples from the synchronous translator and quantizer block 500 (FIG. 8) on the X bus 504 and the Y bus 506, enter the chip coordinate conversion block 600 at a rate of two samples per chip interval. Under conditions where the timing and tracking circuits are operating ideally, one of the samples (referred to as the "even" sample) occurs at the peak of correlation between the chip symbol and its matched filter. Also under ideal conditions, the other (or "odd") sample occurs at an instant for which the filter output is nominally null when adjacent chips are of opposite signs. As explained above in connection with FIG. 9, the graph 560 represents the chip symbol data waveform that would exist under conditions of exact phase tracking, and a second graph 564 represents the strobe clock on the line 514 into the synchronous translator and quantizer block 500 in FIGS. 7 and 8. As illustrated, the strobe cloc 562 has a frequency which is twice the chip data rate. The chip symbol data waveform 560 is digitized by the P channel quantizer 554 and the Q channel quantizer 558 to yield the plurality of chip symbols on the X and Y data bases 504 and 506, respectively. Each chip symbol is represented by a positive peak 564 or a negative peak 566 between adjacent null values 568 and 570. Since there may be, in general, a small but finite difference between the carrier intermediate frequency of the incoming signal on the line 468 to the synchronous translator and quantizer block 500 (FIG. 8), and that of the local oscillator 540 in the synchronous translator and quantizer block 500, the X data samples and the Y data samples on the buses 504 and 506, respectively, provided as inputs to the tracking circuits block 502 from the synchronous translator and quantizer block 500, will be comprised of a trigonometrically weighted sum of the transmitted P and Q data signals, and may be tumbling in phase space at a rate equal to the residual frequency difference.

Figure 11:
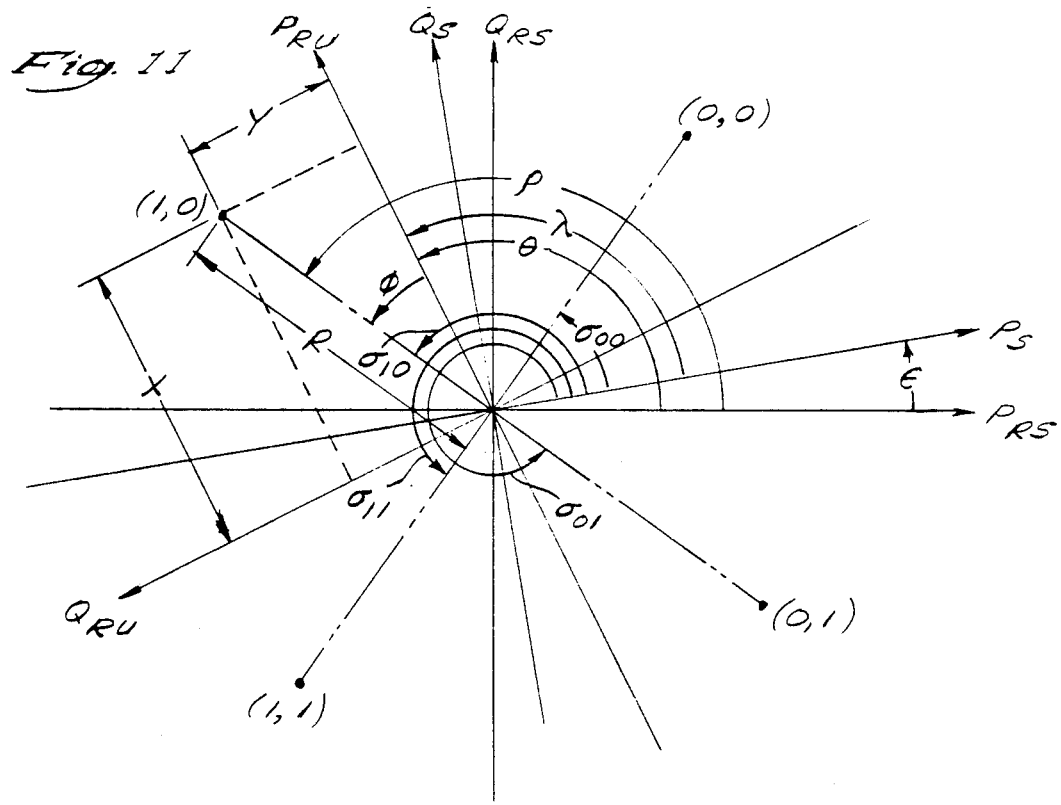
FIG. 11 is a graphical representation of the tumbling of received data with respect to transmitted data, showing the received data with respect to three PQ coordinate systems, the transmitted signal coordinates $P_S$ and $Q_S$, the unstabilized received signal coordinates $P_{RU}$ and $Q_{RU}$, and stabilized received signal coordinates $P_{RS}$ and $Q_{RS}$.

The tumbling may be understood by referring to FIG. 11. As set forth above in connection with FIGS. 4a and 4b, the data transmitted by the transmitting ground station 200 (FIG. 3) causes the intermediate frequency to assume one of four phases (i.e., 45°, 135°, 225° or 315°) depending upon the combination of P data and Q data being sent. These four phases are shown with respect to a sending coordinate system, wherein $P_S$ corresponds to the sending P coordinate and $Q_S$ corresponds to the sending Q coordinate. Thus, a data combination of P=0 and Q=0 causes the transmitted phase to have an angle of 45° (shown as $\sigma_{00}$) with respect to the $P_S$ coordinate axis. A data combination of P=1 and Q=0 causes the transmitted signal to have an angle of 135° (shown as $\sigma_{10}$) with respect to the PS coordinate axis. Similarly, combinations of P=1 and Q=1, and P=0 and Q=1 cause angles of 225° ($\sigma_{11}$) and 315° ($\sigma_{01}$), respectively. If the local oscillator 540 in the synchronous translator and quantizer block 500 (FIG. 8) is locked to the corresponding oscillator 284 in the phase modulator 220 (FIG. 5), the synchronization of the received data stream and the demodulation of the data stream into its P and Q components would be a simple matter. However, the oscillator 540 is not locked with the oscillator 284. Thus, the data produced by the synchronous translator and quantizer block 500 will be produced with respect to a coordinate system defined by the oscillator 540 and the clock generator 536 (FIG. 8). This coordinate system is illustrated in FIG. 11 by a P coordinate $P_{RU}$ and a Q coordinate $Q_{RU}$, and are referred to as the unstabilized coordinates. For example, the unstabilized P coordinate $P_{RU}$ is shown as being approximately 100° out of synchronization with the transmitted coordinate $P_S$ (illustrated by an angle λ). Thus, for example, a data combination of P=1 and Q=0 which appears at an angle of approximately 135° with respect to the $P_S$ and $Q_S$ coordinates of the transmitter will appear at an angle of approximately 35° (shown as $\phi$) with respect to the coordinates $P_{RU}$ and $Q_{RU}$. The output of the synchronous translator and quantizer block 500 on the X bus 504 and the Y bus 506 will be a digital representation of the magnitude along the $P_{RU}$ coordinate axis, shown as the magnitude X, and the magnitude along the $Q_{RU}$ coordinate axis, shown as the magnitude Y. Thus, the unstabilized outputs on the X bus 504 and the Y bus 506 will appear as a data combination of P=0 and Q=0 rather than P=1 and Q=0. Furthermore, in the example presented, the X magnitude and the Y magnitude are unequal. The chip coordinate conversion block 600 and the phase/frequency tracking block 604 operate together to translate the received data information on the X data bus 504 and the Y data bus 506 to a magnitude and an angle in a stabilized coordinate system shown as $P_{RS}$ and $Q_{RS}$.

Figure 12:
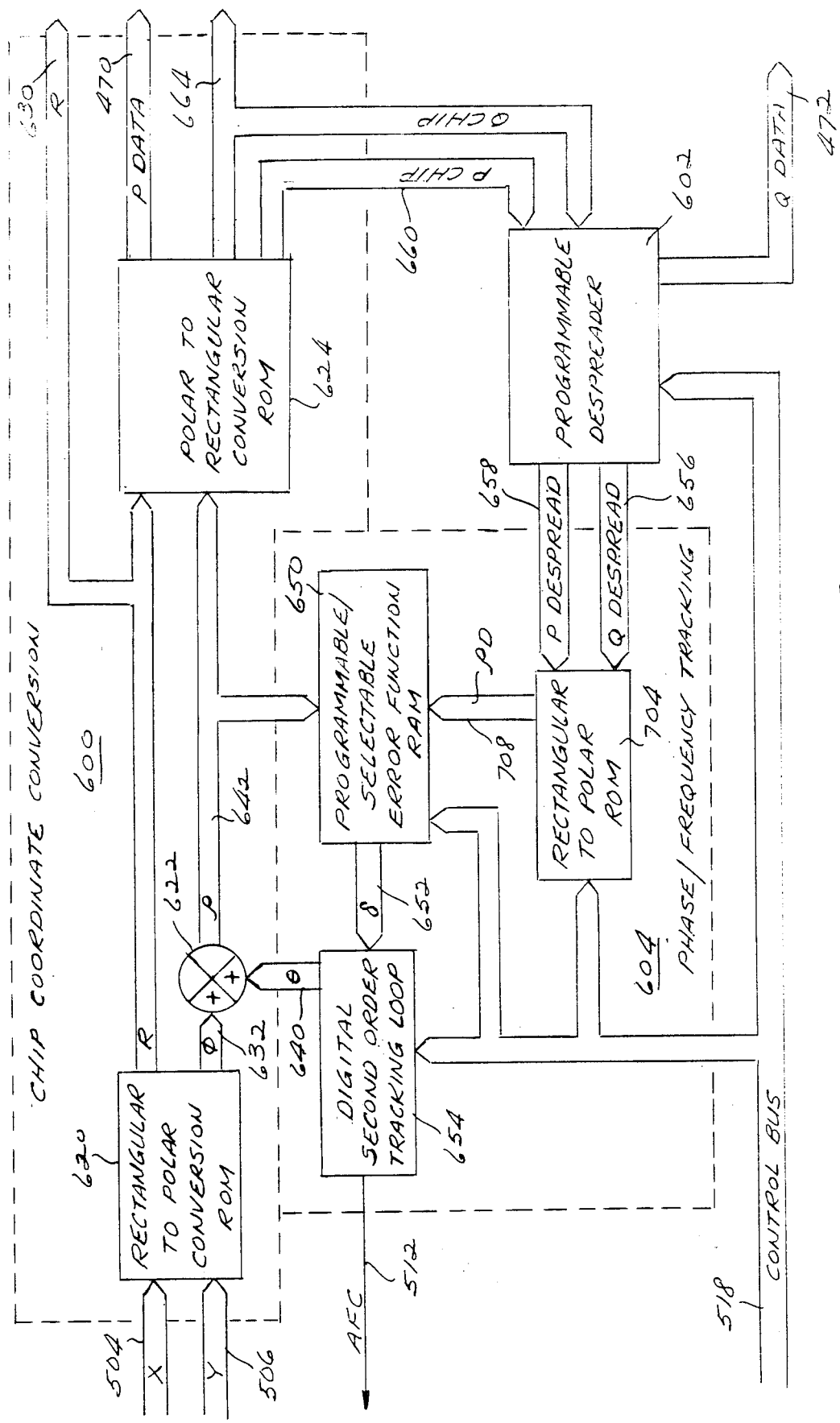
FIG. 12 is a block diagram showing additional detail of the chip coordinate conversion block and the phase-frequency tracking block in combination with the despread frequency track block.
Figure 14:
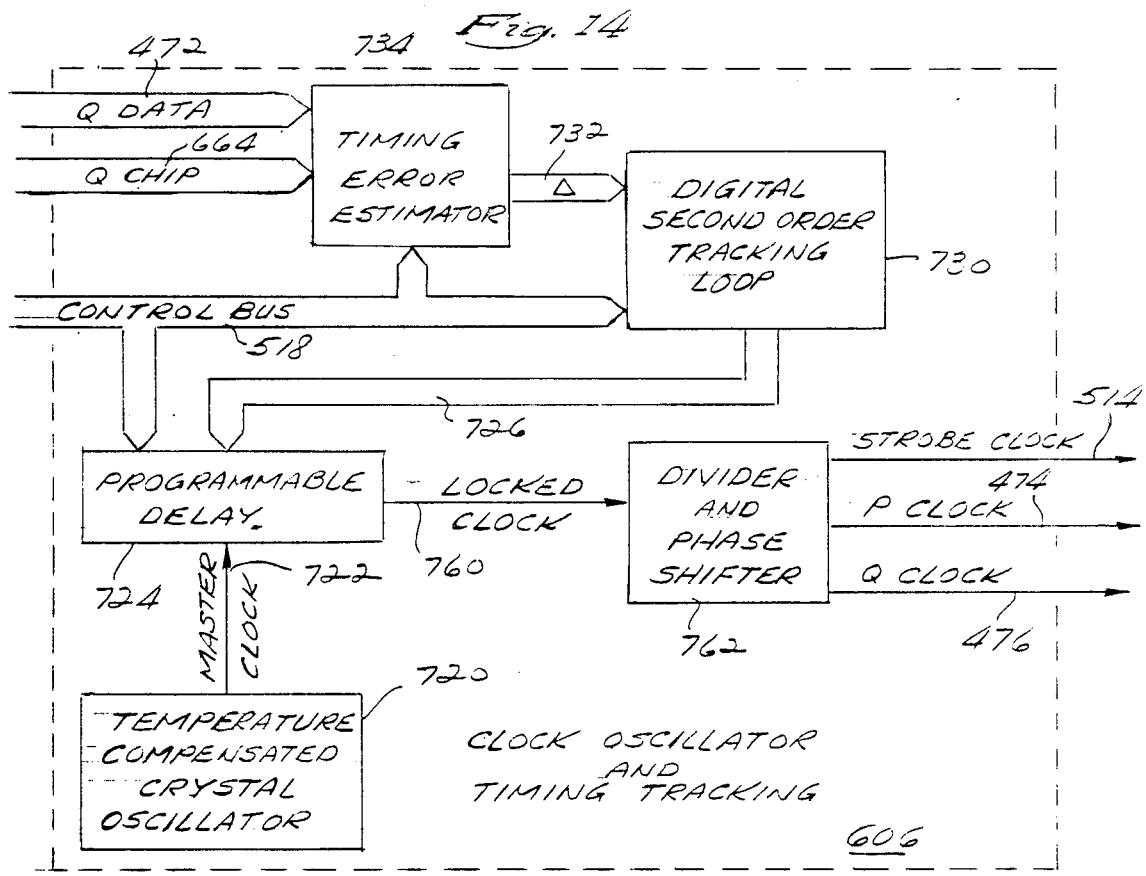
FIG. 14 is a block diagram showing additional detail of the clock oscillator and timing tracking block.

The chip coordinate conversion block 600 and the phase/frequency tracking block 604 are shown in additional detail in FIG. 12 in combination with the despread circuit block 602. The chip coordinate conversion block includes a rectangular to polar conversion ROM 620, an angular combining circuit 622 and a polar to rectangular conversion ROM 624. The rectangular to polar conversion ROM 620 receives the X data samples on the X data bus 504 and the Y data samples on the Y data bus 506 and generates an output signal R on a bus 630 and an output signal $\phi$ on a bus 632. The output signal R is a digital representation of the magnitude of the vector to the measured data point in the unstabilized $P_{RU}$ and $Q_{RU}$ coordinates of the synchronous translator and quantizer block 500 and is shown in FIG. 11. The output signal $\phi$ corresponds to the angle $\phi$ in FIG. 11 and is the angle from the unstabilized PRU coordinate to the measured data point.

The output signal R on the bus 630 is provided as an output signal from the chip coordinate conversion block 600 and is connected to the input of the gain tracking circuit 608 (FIG. 10) where it is used to determine the magnitude of the AGC signal on the line 510. The output signal R is also provided as an input to the polar to rectangular conversion ROM 624. The output signal $\phi$ on the bus 632 is provided as one input to the angular combining circuit 622. The angular combining circuit 622 has an input on a bus 640 that is provided as an output from the phase/frequency tracking circuit block 604. The signal on the bus 640 is a representation of an angle $\theta$. The angle $\theta$ is shown on the diagram in FIG. 11 and is the angular difference between the unstabilized chip coordinate system represented by the coordinates $P_{RU}$ and $Q_{RU}$ and the stabilized chip coordinate system represented by the pair of coordinates $P_{RS}$ and $Q_{RS}$. Ideally, the coordinates $P_{RS}$ and $Q_{RS}$ are substantially identical to the coordinates of the transmitted signal (i.e., $P_S$ and $Q_S$). However, there is generally a small difference angle $\epsilon$ between the transmitted signal coordinates and the stabilized receiver coordinates. The angle $\epsilon$ is shown in FIG. 11 between the coordinate PRS and the coordinate $P_S$.

When the angle $\phi$ and the angle $\theta$ are added by the angular combining circuit 622, a resultant angle $\rho$ is generated on a bus 642. The angle $\rho$ represents the angle between the measured data signal and the stabilized chip coordinates represented by $P_{RS}$ and $Q_{RS}$. Thus, the angle $\rho$ is substantially equal to the angle of the signal that was transmitting by the transmitting ground station 200, and hould be within an angle $\epsilon$ of one of the angles 45°, 135°, 225°, or 315°. For Example, when the signal combination of P=1, Q=0 is transmitted, as discussed above, the angle $\rho$ should be approximately equal to 135°.

Figure 17A:
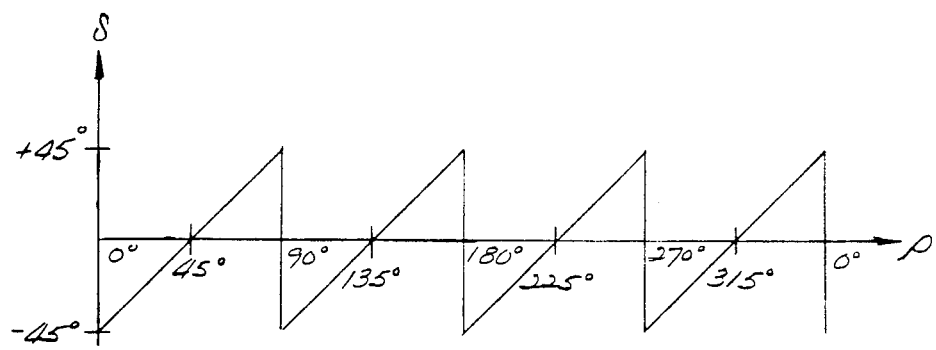
FIGS. 17a is a graphical representation of an error function in the programmable/selectable error function RAM of FIG. 12, showing the angular error output $\delta$ as a function of the input when the Q channel and the P channel have equal modulation powers.

The angle $\rho$ on the bus 642 is provided as an input to the polar to rectangular conversion ROM 624 in addition to the magnitude signal R on the bus 630. The angle $\rho$ is also provided as an input to a programmable/selectable error function RAM 650 in the phase/frequency tracking circuit block 604. In an embodiment having equal power in the P and Q data signals, the angle $\rho$ should assume one of the four possible angles as discussed above. The difference between the angle $\rho$ and the nearest one of these four angles is provided as an output signal from the programmable/selectable tracking circuit block 604 as an angle $\delta$ on a bus 652, and is provided as an input to a digital, second-order, discrete time, discrete phase, tracking loop 654. In one embodiment, the programmable/selectable error function RAM 650 has a plurality of memory storage locations that are addressable by the digitized input $\rho$ in the bus 642. The memory storage locations have data stored therein that is representative of the angular difference between the angle $\rho$ and the nominal angle that would be assumed by $\rho$ in the absence of tracking error (i.e., 45°, 135°, 225°, and 315°) when equal power is applied to the P channel and the Q channel). This is illustrated in graphical form in FIG. 17a, wherein the horizontal axis represents the angle $\rho$ between 0° and 360° and the Y axis represents the angle $\delta$ output from the programmable/selectable error function RAM 650. One skilled in the art will understand that although the graph in FIG. 17a is shown as straight lines, the horizontal and vertical axes represent digital representations of the angles $\rho$ and $\delta$ in accordance with the resolution of the buses 642 and 652. As an example of the operation of the programmable selectable error function RAM 650, when the angle h$\rho$ as an angular magnitude of 50°, the $\delta$ output on the bus 652 has a value of +5°.

The tracking loop 654 integrates the error angle $\delta$ and generates the difference angle $\theta$ on the bus 640 to the angular combining circuit 622. The tracking loop 654 also generates the AFC signal on the line 512 that is fed back into the clock oscillator 524 in the synchronous translator and quantizer circuit block 500 to fine tune the oscillator 524 closer to the intermediate frequency of the transmitted signal. The loop 654 includes a conventional compensated filter structure, the parameters of which may be altered by the control block 516 via the control bus 518 to change the effective bandwidth of the tracking loop. The loop computational rate has two distinct values. When performing the acquisition procedure described above, it operates at a first rate corresponding to the chip symbol rate. After tracking has been achieved, it operates at a second rate which is equal to the Q channel data rate and is thus 1/N of the first rate.

Figure 17B:
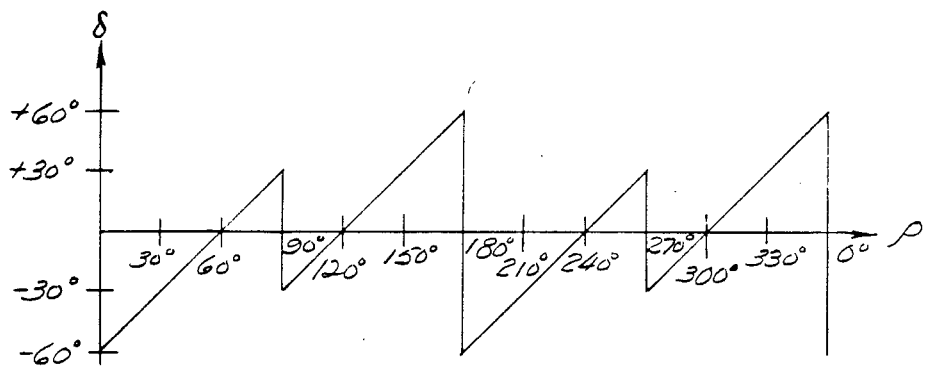
FIG. 17c is a graphical representation of an error function in the programmable/selectable error function RAM of FIG. 12, showing the angular error output $\delta$ as a function of the despread input $\rho_D$ when the present invention is operating in the routine tracking mode.
Figure 17C:
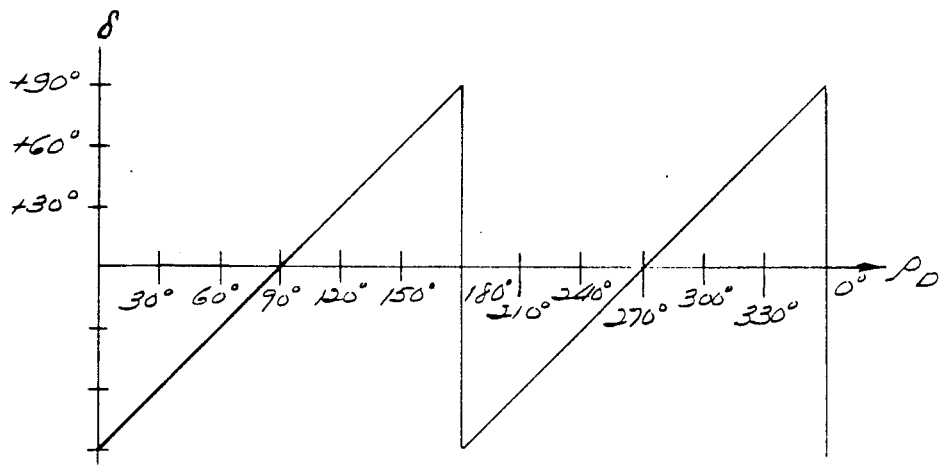
Figure 1:
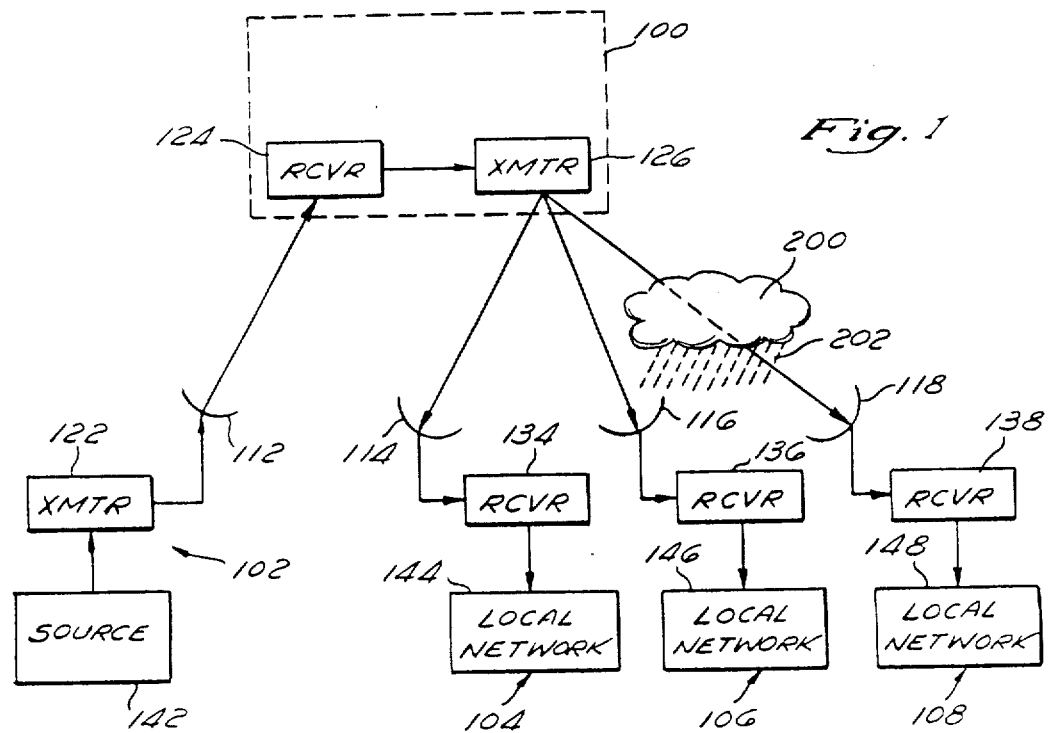
Figure 2:
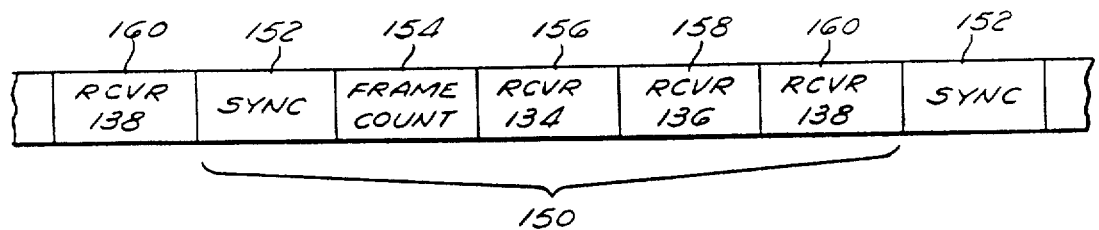

The foregoing description of the operation of the chip coordinate conversion circuit block 600 and the phase/frequency tracking block 604 is very similar when the power in the P data channel and the Q data channel are unbalanced. For example, the data may be transmitted with three times as much power in the Q channel as in the P channel. This corresponds to a Q channel signal magnitude that is $\sqrt{3}$ times the P channel magnitude. Thus, each data point corresponds to an angle of 60°, 150°, 240°, or 330° with respect to the P coordinate. Thus, unlike the foregoing description wherein the difference angle $\rho$ is compared to 45°, 135°, 215°, and 315°, a system receiving this combination of unbalanced power will compare the difference angle $\rho$ with a difference angle of 60°; 150°, 240° or 330°. This is illustrated in FIG. 17b wherein the graph represents the error function stored in the programmable/selectable error function RAM 650 for the unbalanced power embodiment. As with the balanced power function illustrated in FIG. 17a, the error angle output $\delta$ in FIG. 17b has a magnitude of 0° when the input angle $\rho$ is at one of the four nominal angular values in the absence of tracking error (i.e., at 60°, 120°, 240° or 300°). The use of the programmable/selectable error function RAM 650 is a unique feature of this invention because the data content of the RAM 650 can be readily changed via the control bus 518 to conform with different power level functions. For example, in the limit where all of the modulation power is in the Q channel, the error function will appear as in FIG. 17c wherein the angles 90° and 180° represent the absence of tracking error. One skilled in the art will recognize that the graph of FIG. 17c is equivalent to that for a binary phase shift keying system (BPSK). As will be set forth below, when acquisition is accomplished and the control block 516 initiates routine tracking, the function represented by FIG. 17c is stored in the programmable/selectable error function RAM 650, and the RAM 650 is addressed by a variable that is responsive to the despread P and Q data.

For both the equal power embodiment and the unequal power embodiments, represented by the error functions of FIGS. 17a and 17b, respectively, possible outcomes of the acquisition process include misalignment of the transmitted coordinate system ($P_S$, $Q_S$) relative to the receiver's stabilized coordinate system ($P_{RS}$, $Q_{RS}$) by an angle of 90°, 180° or 270°. Misalignments of 90° or 270° result in an apparent interchange of the P and Q coordinates, as seen by the receiver. While these misalignments arise routinely in QPSK demodulators and are usually compensated for by well-known downstream process (e.g., by error control decoders), the fundamental difference between the P and Q data streams in this invention require that such misalignments be recognized and corrected within the demodulator 466. This is achieved in the second step of the acquisition process (the time alignment of the spreading sequence) within the despread block 602 under the direction of the control block 516. The second step of the acquisition process is a despreading synchronization procedure in which the despreading circuit block 602 locks with the beginning of each Q data bit. This process of determining the beginning of the Q data bit is referred to as framing and is well-known in the art. After synchronization of the Q data bit with the despreading sequence is achieved, phase misalignment of 90° or 70° is discriminated based upon the apparent maximum magnitudes of despread Q data and despread P data within the despread circuit block 602. (The despread Q data and the despread P data will be discussed more fully below.) For example, if either a 90° or a 270° misalignment exists, the maximum magnitude of the despread P data will be much larger than the magnitude of the despread Q data, which is the opposite of the usual relationship between the despread Q data and the despread P data. The control block 516 monitors the relative magnitudes of the despread P data and the despread Q data and initiates a 90° phase change in the tracking circuit by adding 90° to the angle e on the bus 640 from the tracking loop 654 (FIG. 12). A residual ambiguity of 80° may exist upon completion of acquisition. Elimination of this residual ambiguity is left to conventional downstream processes.

After the phase/frequency tracking block 604 achieves phase lock with the incoming signal, the control block 516 (FIG. 7) initiates a despreading synchronization procedure in the despread circuit block 602 to provide a despread Q output on a bus 656. (The despreading synchronization will be described later.) Thereafter, the control block initiates commands to the phase/frequency tracking block 604 to switch the phase/frequency tracking block 604 to a routine tracking procedure, rather than the acquisition procedure. The routine tracking procedure is performed by introducing the despread Q channel data to the phase/frequency tracking block 604 via the bus 656 from the despread circuit 602. Since the phase/frequency tracking block 604 is now operating on the despread data, which has a data rate of 1/N of the chip symbol rate, the computational rate of the digital tracking loop in the phase/frequency tracking block 604 drops accordingly. The digital phase tracking loop of the phase/frequency tracking block 604 has internal state variables which are scaled in "per computation" units. Since the computational rate is decreased when the phase/frequency tracking block 604 is switched to the despread data, the internal state variables of the phase tracking loop are also rescaled.

In addition to providing the despread Q data output on the bus 656, the despread circuit 602 provides a despread P data output on a bus 658, for reasons set forth below. Optionally, the despread P data output can be decision directed, as will also be explained below.

The despread Q channel signal and the despread P channel signal are used together in the phase/frequency tracking block 604 to derive an indication of the angular tracking error δ which serves as the input variable to the tracking loop during routine carrier tracking after the signal is acquired. This error variable has a markedly higher signal-to-noise ratio than is available by using the basic chip variables from the synchronous translator and quantizer block 500 without despreading. This feature, together with the narrow loop bandwidth which is established as the final step of the acquisition procedure, is a fundamental basis for the ability of the present invention to maintain synchronization of the coordinate system $P_{RS}$, $Q_{RS}$ with the coordinate system $P_S$, $Q_S$ in the presence of fading caused by rain attenuation or other causes.

Before describing the operation of the phase/frequency tracking block 604 during routine tracking, it is helpful to briefly describe the operation of the despread circuit block 602. The polar to rectangular conversion ROM 624 converts the stabilized polar coordinates to a P chip data stream and a Q chip data streams on a bus 660 and a bus 664, respectively. The rectangular to polar conversion ROM 624 performs independent conversions on the odd and even portions of the data on the R bus 630 and the P bus 642 and provides the conversions as odd and even chip data on the P chip bus 660 and the Q chip line 664. One skilled in the art will understand that the odd and even chip data on each of the buses 660 and 664 are separated in time in accordance with the separation of the odd and even samples on the X and Y data buses 504 and 506. For example, a reference hereinafter to the Q chip odd data stream refers to the Q chip data stream on the bus 664 at the time corresponding to the odd sample. The P chip data stream and the Q chip data stream are digital representations of the P chip data and the Q chip data. For example, the bus 660 and the bus 664 in an exemplary embodiment will be an eight-bit signed representation of the P and Q chip data.

The P chip even data stream corresponds to the P data stream and is provided as an output signal on the P data bus 470. Although the P data could be represented in binary by a single bit corresponding to the sign of the demodulated data, often referred to as the "hard decision" bit, in preferred embodiments, the P data bus includes the sign bit (i.e., the hard decision bit) and one or more additional bits representative of the magnitude of the measured P data signal. This magnitude measurement is conventionally used in many exemplary decoders as an indication of the "quality" of the measured P data signal. The additional bits are often referred to as "soft decision" bits. The additional bits of information are generated by selecting the high order bits of the digital representation of the P data signal and are thus a representation of the magnitude of the P data signal. A higher magnitude P data signal is more likely to be a correct P data signal than a low magnitude P data signal.

The despread circuit block 602 operates on the Q chip even data by applying the spreading sequence to the data in a manner set forth below to extract the despread Q data from the spread Q chip data. The despread circuit block utilizes a sequence generator to generate a sequence identical to that in the encoder 220 in the transmitting ground station 200 (FIG. 3). The sequence is used to control a combiner to selectively add or subtract the incoming Q chip even data to produce the despread Q data output on the bus 472. As with the P data output from the chip coordinate conversion block 600, the Q data output preferably includes hard and soft decision bits and thus, has at least one data bit in addition to the sign bit to indicate the relative magnitude of the Q data bit.

The despread circuit block 602 receives commands from the control block 516 in the demodulator 466 (FIG. 7) via the control bus 518. The despread circuit block 602 includes an internal combiner which has an output that indicates the correlation between the spreading sequence and the incoming chip data stream. Under the direction of the control block 516, the phase of the sequence generator in the despread circuit block 602 is stepped repeatedly during the acquisition procedure until the combiner output shows a sharp increase in amplitude indicative of correct alignment. The combiner is a moving window averager which alters the sign of the even Q channel chip stream in accordance with the internal sequence generator of the despread block 602, and adds N such digital samples together to form the Q channel data output on the Q data bus 472. N is an integer which denotes the ratio of the bit data rates in the P and the Q channels that were transmitted by the transmitting ground station 320. For example, in an exemplary system, the P channel may operate at 64,000 bits per second and the Q channel at 8,000 bits per second. In this example, N would be equal to 8.

As set forth above, the despread circuit block determines whether the eight received chips correspond to a Q data bit equal to a "1" or a Q data bit equal to a "0" by determining whether the received pattern corresponds more closely with a "1" sequence or the complimentary "0" sequence It does this by selectively altering the sign of the incoming chips and adding the result. Since each incoming chip has a digital magnitude rather than a simple sign bit, the despread circuit block 602 adds the incoming magnitude when the despread sequence has a "0" and subtracts the incoming magnitude when the despread sequence has a "1." For example, with the spread sequence of 10110100, a Q data bit of "1" will be represented by the sequence of chips with signs corresponding to the binary sequence "01001011," and a "0" will be represented by the sequence of chips with signs corresponding to the binary sequence "10110100." Each sequence gives rise to a sequence of samples whose signs, in the absence of noise, correspond with these sequences. For example, a binary "1" will be represented by magnitudes having the signs $-+++-+--$. When despread, the "0" sequence will result in a sequence of eight positive magnitudes which are added to produce a total positive magnitude, while a "1" sequence will result in a sequence of eight negative magnitudes which result in a total negative magnitude. An error of 1, 2 or 3 chips will result in a reduction of the magnitude but will retain the correct sign of the Q data. Thus, the magnitude is provided as an indication of the relative merit of the Q data.

Since the Q channel data rate is 1/N the P channel data rate, the Q data output on the Q data bus 472 from the despread circuit block 602 will have a net energy-to-noise ratio that is N times higher than the raw chip energy-to-noise ratio observed at the quantizers in the synchronous translater and quantizer block 500 (FIGS. 7 and 8). The output of the despread circuit block 602, corresponding to the Q chip even samples, is provided on the bus 656 to the phase/frequency tracking block 604. Furthermore, the Q data output on the Q data bus 472 is provided to the clock oscillator and timing tracking block 606.

Figure 13:
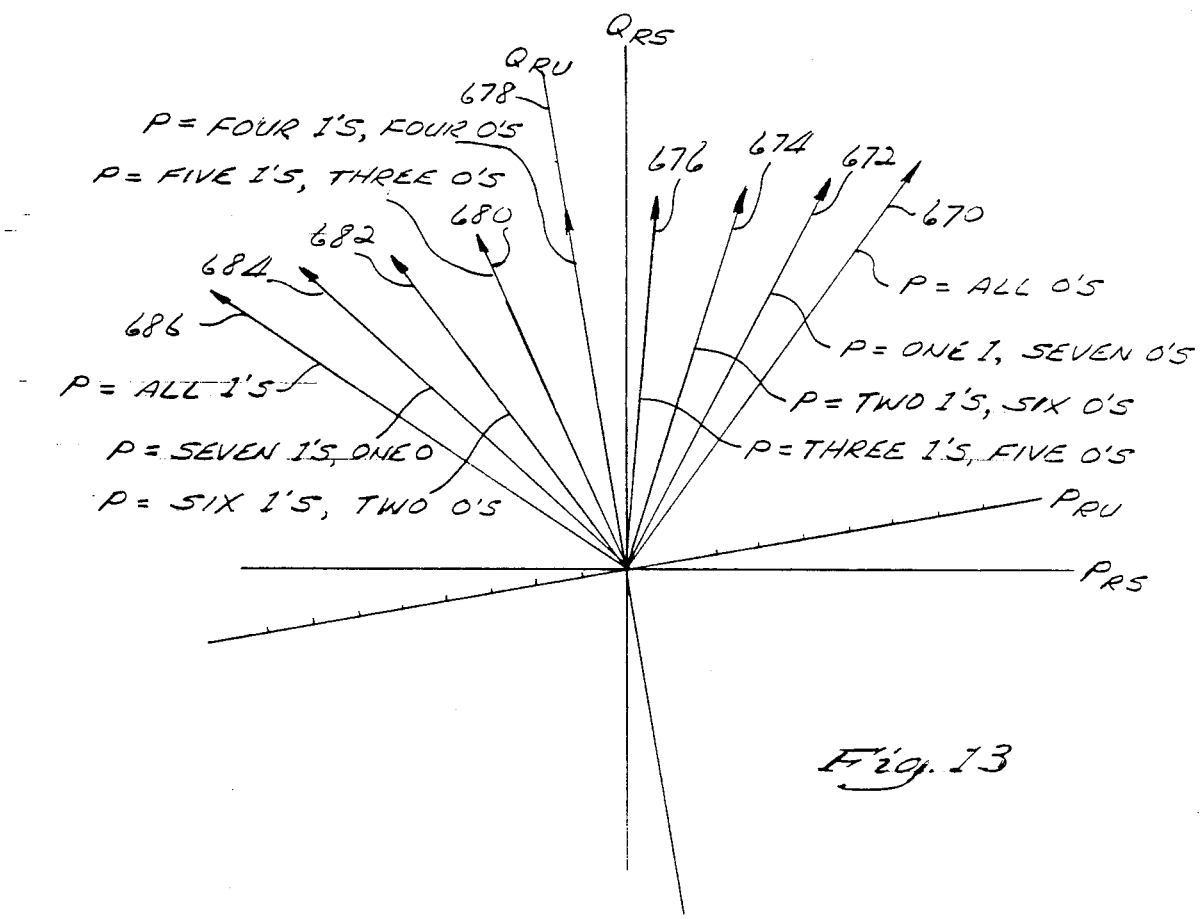
FIG. 13 is a graphical representation of the method of determining the angular position of the unstabilized P and Q coordinates by first determining the mean angular position of the P data signals.

The use of decision direction during routine tracking is illustrated in FIG. 13 wherein the receiver stabilized coordinate system comprising coordinates $P_{RS}$ and $Q_{RS}$ and the transmitters coordinate systems $P_S$ and $Q_S$ are illustrated. The receiver's unstabilized coordinate system is not shown in this diagram. During each of the Q data bit periods, the despread circuit block 602 receives N (e.g., 8) Q chip symbols. Assuming that the chip sequence comprises no erroneous chips, the total magnitude of the chips in the sequence are also usable to maintain tracking. For example, assuming the maximum magnitude of each of the chips is normalized at 100, the despread sum of the eight chips in a sequence should be equal to 800. However, if the tracking is off such that the phase angle of the received data, as corrected by the angular combining circuit 622 is not at 45° or one of its multiples, 135°, 225° or 315°, then the despread sum will be smaller. In order to calculate the apparent error angle δ, data from the P chip stream is included to provide both coordinates for the calculation. Thus, the P chip even data stream is despread in a manner similar to that of the Q chip even data stream and is provided as an output on the despread P data bus 658. The despread P output data is the sum of the P chips during each Q bit time obtained by using the same sequence of despread sign reversals as described above for the despread Q data. Since the P chip data is independent of the spreading sequence, it varies randomly with respect to the despread sequence and thus the despread P data will not typically combine coherently to a large magnitude as occurs for the Q data stream. Thus, the relative magnitude of the despread P data can be monitored by the control block 516 and, if larger than the magnitude of the despread Q data, cause the control block 516 to initiate the 90° phase change discussed above. For example, during each of the intervals comprising one Q data bit time, the sum of the P chips can be equal to one of nine different values corresponding to nine different angles with respect to the stabilized coordinate system of $P_{RS}$ and $Q_{RS}$. These angles are represented by a set of nine vectors 670, 672, 674, 676, 678, 680, 682 and 684. The vector 678 corresponds to the same number of despread P chips being equal to 1's and 0's (i.e., four 1's and four 0's), and is the most likely outcome, assuming that the P chip inputs are truly random. The vector 670 corresponds to all eight of the despread P chips being equal to zero, and the vector 684 corresponds to all eight of the despread P chips being equal to one. The vectors 670 and 684 have a low probability of occurring when the P chip data is random. Over extended periods of time, the despread P data should average to equal numbers of logical 1's and logical 0's and the vector 678 represents the greatest probability over the extended amount of time. Thus, although a meaningful error angle cannot be calculated during a single chip time or even during a single Q data bit time, when the calculations are performed over an extended time, the error angle has a high probability of being correct. By reducing the bandwidth of the tracking loop (i.e., the rate at which corrections are made to the tracking angle), the effects of the instantaneous errors caused by the random P chip data are reduced and only an overall change caused by tumbling will cause the tracking angle to change. The tracking system described herein thus has the effect of integrating the instantaneous errors to provide an average error over an extended period of time.

The outputs of the despread circuit block, comprising the despread P data on the bus 658 and the despread Q data on the bus 656, are provided to a rectangular to polar conversion ROM 704 in the phase frequency tracking block 604. The rectangular to polar conversion ROM 704 provides an output on a bus 708 that represents an instantaneous angle $\rho_D$ to the programmable/selectable error function RAM 650. In the routine tracking mode, the angle $\rho_D$ is used by the programmable/selectable error function RAM 650 rather than the angle ρ on the bus 642 to generate the signal δ in accordance with the error function shown in FIG. 17c. Thus, during routine tracking, the digital tracking loop 654 is provided with an error angle that is derived from the despread signals from the despread circuit block 602, and is therefore less sensitive to noise and attenuation. Since the error function shown in FIG. 17c is substantially equivalent to that of a BPSK signal set, the routine tracking in the present invention has substantially the same noise immunity as a BPSK system. As set forth above, the tracking loop 654 does not respond to instantaneous angular errors but will integrate the errors over an extended time and respond to the mean angular error and its time rate of change.

In an alternative embodiment of the present invention, the despread circuit block 602 is programmable to provide decision direction for the despread P chip data on the bus 700. This is accomplished by subtracting the mean magnitude of the P chips from the resultant vector before providing the despread P data as an output on the despread P data bus 700. For example, in the example presented above, the vector 672 represents a P chip stream of one logical "1" and seven logical "0's" during a Q data bit interval. Using the example of a normalized magnitude of 100 for the measured data, a magnitude of 600 (corresponding to $7 \times 100 - 1 \times 100$) would be subtracted from the P component of the vector 672 to arrive at the vector 678. Although incorrect determinations of one or more of the P chips in a sequence can cause the calculations to arrive at an incorrect resultant vector, the average of the errors over an extended calculation period will again cancel out as in the non-decision directed embodiment. The decision direction method has the advantage of reducing the variance in the instantaneous error angle $ρ_D$.

By relying upon the despread Q data and upon the average P data, the present invention maintains tracking even in the presence of received P data that cannot be used by the downstream decoder and user devices. Thus, tracking can be maintained and Q data output generated during degraded signal receptions.

The bandwidth reduction process causes the effective loop bandwidth of the tracking loop to be varied by degrees from the rather wide value that pertains during acquisition to a final value in the range of 100 Hz. This value of bandwidth yields an optimum trade-off in terms of minimizing the phase tracking jitter against the competing demands of thermal noise and phase noise. When the phase tracking loop is in the routine tracking mode with the bandwidth reduced to its optimum value, the phase/frequency tracking block 604 will maintain carrier phase tracking at a Q channel energy-per-dimension-to-noise ratio ($E_d/N_o$) of −1 dB or higher. This corresponds to a chip-energy-to-noise ratio ($E_c/N_o$) of −1 minus log (N) dB or −10 dB in the representative case where N equals 8. For a normal clear sky reading of +4 dB for $E_c/N_o$, the demodulator described herein can sustain a rain fade of 14 dB while retaining the integrity of the carrier tracking function.

During acquisition and during routine tracking, the phase/frequency tracking block 604 provides, under the direction of command signals on the control bus 518 from the control block 516 (FIG. 7) the automatic frequency control (AFC) signal on the line 512 which is provided as an input to the controllable oscillator 540 in the synchronous translator and quantizer block 500 (FIG. 5). The AFC signal is routinely derived from an internal state variable of the digital second order loop which is proportional to the frequency error. Only the sign of this state variable is significant in deriving the AFC signal and a digital-to-analog converter which generates the control voltage for the controllable oscillator 540 is incremented or decremented accordingly.

The clock oscillator and timing tracking block 606 provides for the generation of accurate clocking pulses which are long-term synchronous with the clock oscillator of the encoder 230 of the transmitting ground station 200. The clock oscillator and timing tracking block 606 permits reliable tracking of the chip timing to continue, even under conditions of very low chip energy-to-noise ratio. The clock oscillator and timing tracking block 606 has an acquisition mode and a routine tracking mode, with the former being based upon the Q chip even and odd signal inputs on the bus 664, and the latter being based upon the despread output from the despread circuit 602 on the Q data output bus 472.

The clock oscillator and timing tracking block 606 includes a temperature compensated crystal controlled clock oscillator 720 with inherent frequency accuracy and with minimal phase noise. The clock oscillator has an absolute accuracy of one part per million, or better, and has a phase noise that is negligible. The output of the clock oscillator is provided on a line 722 to a programmable delay line 724 which allows the leading edge of the clock to be adjusted to within 1/64 of a chip interval. The programmable delay line is under the control of signals received on a bus 726 from a digital second order tracking loop 730. The digital second order tracking loop 730 is driven by an error signal Δ on a bus 732 from a timing error estimator circuit 734. The timing error estimator circuit 734 is driven by the Q data output of the despread circuit 602 on the bus 472 and by the Q chip even data and the Q chip odd data on the bus 664.

During both acquisition and routine tracking, the clock oscillator and timing tracking block 606 uses the odd samples of the Q chip data stream on the bus 664 as its primary input. These samples, which should correspond temporally to transitions between the chip intervals on the X data bus 504 and the Y data bus 506 of the synchronous translator and quantizer block 500 (FIG. 8), are near zero when adjacent chips have opposite sign and the clock is properly timed. (See FIG. 9) When the sampling strobes occur slightly early, these odd samples tend to preferentially acquire the sign of the preceding chip, and when the sampling strobes occur slightly late, the odd samples tend to preferentially acquire the sign of the current chip. Thus, the detection of an odd sample having the sign of the preceding chip causes a loop error signal having a polarity that causes the strobe clock to be delayed in time so that subsequent odd strobes occur closer to the null points. Similarly, the detection of an odd sample having the sign of the current chip causes a loop error signal having a polarity that causes the strobe clock to be advanced in time. When adjacent chips have the same sign, the odd samples, illustrated by the partial nulls 570 in FIG. 9, display the corresponding value and are not useful for forming a clock loop error signal and are ignored by the timing error estimator of the present invention. However, the spreading sequence used in the Q channel in the present invention guarantees that a substantial number of alterations in the data stream will occur so that an ample error signal can be established at the drive point of the clock tracking circuits.

During acquisition, the tracking loop within the clock oscillator and timing tracking block 606 uses the direct Q channel chip stream on the bus 664 as its driving variables. This results in the achievement of rapid lock even though it does not benefit from the high signal to noise ratio of the despread signal. Since the phase tracking loop within the phase/frequency tracking block 604 typically will not be locked during the acquisition procedure, the Q channel chip inputs on the bus 664 will most likely comprise a trigonometrically weighted blend of the P and the Q channels, with the weighting ratio slowly changing due to the tumbling of the unlocked phase space. The timing loop within the clock oscillator and timing tracking block 606 will nevertheless achieve lock under these conditions since a zero crossing will occur in the Q chip odd samples when both the P and Q channel chips differ in adjacent chip times. An error signal based on these events will be of the proper sense to slew the loop towards the point of stable tracking. The presence of clock lock is evidenced by the ratio of the amplitudes of the even and gated odd samples attaining a high value and by the variance of both sample types dropping to a low value.

At the point in the acquisition cycle where despreading of the Q channel is achieved, the clock oscillator and timing tracking loop within the clock oscillator and timing tracking block 606 changes its tracking strategy to exploit the improved signal to noise ratio available from the despread Q data output on the line 472. This processing yields a clock generation process which is capable of maintaining correct clock operation at all signal to noise ratios for which the phase/frequency tracking block 604 can maintain carrier tracking. This approach strongly enhances the reliability of the resultant error signal for timing tracking.

Figure 15:
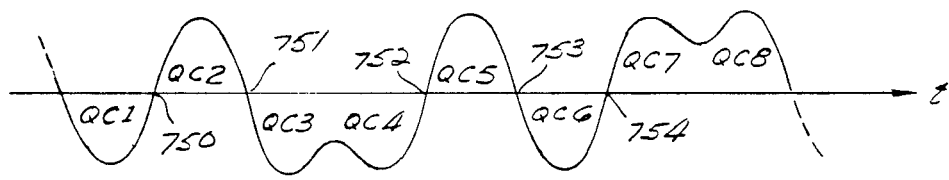
FIG. 15 is a graphical representation of an exemplary chip symbol data stream for a Q bit equal to a logical "0", showing five transitions between opposite-signed chip symbols.
Figure 16:
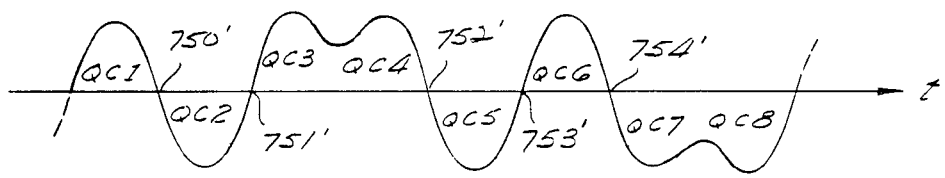
FIG. 16 is a graphical representation of an exemplary chip symbol stream for a Q bit equal to a logical "1", showing the five transitions having opposite sign directions to those in FIG. 15.

The foregoing can be explained in connection with FIG. 15 which is a partial reproduction of FIG. 9. As illustrated in FIG. 15, an exemplary Q data bit comprises eight Q chip times labelled as QC1, QC2, QC3, QC4, QC5, QC6, QC7, QC8. There are five distinct nulls in the chip sequence. A null 750 occurs between the chip times QC1 and QC2; a null 751 occurs between the chip times QC2 and QC3; a null 752 occurs between the chip times QC4 and QC5; a null 753 occurs between the chip times QC5 and QC6; and a null 754 occurs between the chip times QC6 and QC7. The nulls at the beginning and the end of the chip sequence (i.e., before the chip time QC1 and after the chip time QC8) are not well-defined because they may be between opposite-signed chips or between like-signed chips. The null between QC3 and QC4 and the null between QC7 and QC8 are always between like-signed chips and therefore cannot be used. The chip sequence in FIG. 15 is for Q bit equal to a logical "0." The chip sequence for a logical "1" has nulls between the same chip times but the transitions are in the opposite direction. This is illustrated in FIG. 16 wherein the corresponding nulls are represented by 750', 751', 752', 753', and 754', respectively. The present invention determines the clock error and thereby determines the correction needed by measuring the magnitude of the Q chip odd samples at the nulls 750, 751, 752, 753 and 754. If the timing was absolutely correct, none of the nulls 750-751 would have a measurable magnitude and no correction would be needed. If the clock timing is late, the Q chip odd samples at the nulls 750, 752 and 754 will each include a small positive magnitude, while the measurements at the nulls 751 and 753 will each include a small negative magnitude. On the other hand, when the clock timing is early, the Q chip odd samples at the nulls 750, 752 and 754 will each include a small negative magnitude and the samples at the nulls 751 will each include a small positive magnitude. The present invention takes advantage of the relationship between the five nulls to determine whether the strobe clock generated by the clock oscillator and timing tracking block 608 should be advanced or delayed. The timing error estimator block 734 is programmed via the control bus 518 to add the positive transitions 750, 752 and 754, and to subtract the negative transitions 751 and 753 as follows:

$$SUM = MAG_{750} - MAG_{751} + MAG_{752} - MAG_{753} + MAG_{754}$$

wherein $MAG_{750}$ corresponds to the measured sign and magnitude of the sample at the null 750, and so on. Since the magnitudes of the samples at the nulls 751 and 753 have the opposite sign as the magnitudes at the nulls 750, 752 and 754, the foregoing SUM will have a positive value if the clock is late and will have a negative value if the clock is early. Further, the magnitude of the SUM will be larger in accordance with the amount of time by which the clock is early or late. Since the transitions are all reversed when the Q chip sequence corresponds to a logical "1" as illustrated in FIG. 16 rather than a logical "0" as illustrated in FIG. 15, the foregoing SUM results in a negative value if the clock is late and results in a positive value if the clock is early. In order to compensate for this, the timing error estimator block 734 utilizes the sign of the Q data input on the bus 472 to selectively invert the SUM when the despread circuit block 602 has determined that a chip sequence corresponds to a logical "0." The timing error estimator block 734 produces an error output signal $\Delta$ having the following characteristic:

$$\Delta = BITSIGN * SUM$$

where BITSIGN is a $+1$ when the Q chip sequence corresponds to a logical "1" and is a $-1$ when the Q chip sequence corresponds to a logical "0." Since the SUM does not depend upon the BITSIGN, the SUM can be determined by adding the selected odd samples as they are received in accordance with the formula set forth above. Only after the SUM is determined is it necessary to selectively negate the SUM in accordance with the BITSIGN.

The magnitude and sign of $\Delta$ is provided as the input to the digital second-order tracking loop 730. The tracking loop 730 averages the error signal represented by $\Delta$ over a selected period of time and provides an output signal on the bus 726 to the programmable delay block 724. The signal on the bus 726 selects a programmable delay in 1/64th clock cycle increments to synchronize the master clock on the line 722 with the incoming chip samples. The delayed clock is provided on a locked clock output line 760 to a divider and phase shifter block 762. For example, when the tracking loop 730 determines that the chips are being sampled early, it generates a selection signal on the bus 726 that causes the programmable delay block 724 to add an extra 1/64th of a clock cycle of delay from the input master clock on the line 722 to the locked clock on the line 760. Conversely, when the tracking loop determines that the chips are being sampled late, it generates a selection signal that causes the programmable delay block 724 to reduce the delay by 1/64th of a clock cycle. The divider and phase shifter block 762 produces the strobe clock on the line 514 that operates at twice the chip rate, as described above. The divider and phase shifter block 762 also generates the P clock on the line 474 that operates at half the strobe clock rate (i.e., at the chip rate), and generates the Q clock on the line 476 that operates at 1/N the P clock rate (e g., at ⅛ the P clock rate in the example presented herein).

The gain tracking block 608 is a conventional circuit and includes a first order digital tracking loop which monitors the signal amplitude at the chip level (i.e., the variable R from the chip coordinate conversion block 600 on the bus 630), and processes the signal amplitude to yield a gain adjustment signal (i.e., the AGC signal on the line 510) which controls the controllable amplifier 520 in the synchronous translater and quantizer block 500 (FIG. 8). The gain control loop within the gain tracking block 608 endeavors to maintain the mean value of the R signal amplitude near an optimum point on the analog-to-digital conversion scale of the quantizers 552 and 554 in the synchronous translater and quantizer block 500. During the acquisition cycle, the gain control loop within the gain tracking block 608 sets the initial gain to maximum and then decreases the gain until the average value of the R signal amplitude is satisfactory. An additional level of processing that is performed within the gain tracking block 608 is to calculate the apparent signal-to-noise ratio and to control an external demodulator variable which indicates whether the current level of fading is in excess of the margin available in the P channel. This signal which is provided on the fade indicator signal output line 478 is used by the downstream processes, such as the decoder 480 (FIG. 3) to determine whether traffic should be accepted from the P channel. Furthermore, when the system of the present invention is used in an addressed communication system, the downstream processes will communicate back to the transmitting ground station 200 (FIG. 3) to indicate that the P channel signal has faded and that the communications addressed to the receiving ground station 204 (FIG. 3) should be re-routed to the Q channel.

Prior systems which have used quadrature phase shift keying as a means for transmitting two separate data channels on the same frequency (See for example, "Carrier Synchronization Techniques for Unbalanced QPSK Signals-Parts 1 and 2," *IEEE Transactions on Communications,* Vol. Com-26, No. 9, September 1978, pages 1325–1341.) Unlike those prior systems, the present invention combines the two signals (i.e., the P signal on the line 232 and the Q signal on the line 234 in the transmitting ground station 200) to provide an apparatus and method for mitigating the effect of precipitation on the signal transmitted from the satellite 202 to the antenna 462 in the receiving ground station 204. In particular, the Q signal on the line 224 is operated at a much lower data rate than the P signal on the line 222. By operating the Q channel at a lower data rate, the signal on the Q channel is more robust in the presence of heavy precipitation. For example, it is known in the field of the present invention that given equal transmission power levels for two signals, a signal operating at a lower data rate will have a better signal-to-noise ratio than the signal operating at the higher data rate. In particular, the difference in data rates translates directly to the same ratio as the difference in the signal-to-noise ratios for the two signal paths. As a particular example, if the P channel is operating at a data rate of 1 megabit per second and the Q channel is operating at 125 kilobits per second (i.e., an 8 to 1 ratio in speed) than the Q channel will have a 9 dB advantage in the signal-to-noise ratio over the P channel. The Q channel will thus have an additional 9 dB of rain margin in the presence of heavy precipitation. Therefore, in the example previously discussed, if a storm cell having heavy precipitation lies in the path between the satellite 202 and the ground station receiving antenna 462, and causes a 9 dB attenuation in the signal received by the ground station receiving antenna 462, the transmission of the signal on the Q channel at ⅛th the data rate will compensate for the attenuation. The present invention makes use of the relationship between the data rate and the signal to noise ratio to provide an alternative path for data transmission when a ground station is affected by heavy precipitation.

In the present invention, the P channel and the Q channel provide two distinct, but interrelated data paths. The P channel is used as the principal channel for the transmission of data from the transmitting ground station 200 to the satellite 202 and from the satellite 202 back to the receiving ground station 204 and other receiving ground stations (not shown). Typically, the downlink between the satellite 202 and the receiving ground station 204 has a 2 dB noise margin over the minimum signal required for transmission from the satellite 202 to the ground station 204 in clear weather. In other words, the signal in the downlink has approximately 1.6 times the power required to communicate a signal having close to 100% probability of being received in clear weather. This same signal has a high percentage of probability (e.g., 99.99%) of being received in the presence of 2 dB or less of attenuation during a mild rain fade. On the other hand, when the attenuation caused by rain fade is greater than 2 dB, the probability of the ground station 204 successfully receiving the signal on the P channel is reduced. This can have the effect of losing the data transmitted on the P channel, as well as losing synchronization with the transmitted signal. In order to prevent the loss of signal, and, more particularly, in order to prevent the loss of synchronization with the transmitted signal, the present invention operates the Q channel at a much lower data rate, determined by the required rain fade margin.

The Q channel is used for the transmission of frame synchronization and identification information and other "necessary" control functions. By transmitting the frame synchronization and identification information on the Q channel, there is less likelihood that a receiver affected by a deep fade will lose synchronization with the incoming data stream. Thus, although the receiver affected by the heavy precipitation may lose the P channel data, it will continue to maintain synchronization with the Q channel. The P channel and the Q channel are synchronized together so that, as soon as the fade condition is over, the receiver can immediately resume the acquisition of the P channel.

The operation of the transmitting ground station 200 and the receiving ground station 204 in the presence of rain attenuation differs with respect to the overall operation of the satellite communication system. In the broadcast embodiment described above, when the transmitting ground station 200 is broadcasting to all of the receiving ground stations 204 (and the others not shown), the Q channel includes a frame synchronization and identification information and priority data information. For example, the Q channel includes emergency broadcast information, or the like, that has a high degree of urgency. The Q channel can also include information that is typically transmitted only one time and is lost if not received during that transmission time. For example, if the service using the satellite communication system transmits current stock market information, it is particularly advantageous to transmit the stock market information on the Q channel so that there is a lower probability that the stock market information will be lost. The selection of the data to be transmitted on the Q channel will depend in large part upon the criteria set by the user of the satellite communication system.

When the apparatus and method of the present invention are used in an addressed communication system (i.e., when different ground stations receive different data), the Q channel is used for a different purpose. The Q channel is still used to transmit frame synchronization and identification information and other traffic that is common to the individual ground stations that cannot be lost. For example, the Q channel is used to transmit time slot allocation information. This is particularly advantageous when the data communications traffic to each of the ground stations varies frequently. In such situations, it is necessary to frequently reallocate the time slots in each data transmission frame so that each ground station has an adequate number of time slots to receive all of the data directed to it. Other than the frame synchronization and identification data and the "priority" data, the remaining data transmitted by the transmitting ground station 200 is transmitted on the P channel so that a substantial portion of the available time slots on the lower data rate Q channel or available to mitigate rain attenuation. As a specific example, the satellite communication system of FIG. 3 may be used in a network requiring an overall data rate of 64,000 bits per second under clear sky conditions. The P channel data rate is then selected at 64,000 bits per second. The Q channel data rate is selected to handle the statistical fading problems caused by precipitation. For example, the statistical information available for the United States would indicate that there is a 1% average probability that one or more of the receiving ground station will incur attenuation greater than the 2 dB margin provided by the transmitter in the satellite 202. Using this figure, the Q channel requires a data rate of approximately 640 bits per second to provide the deep fade protection. Using an arbitrary factor of 10 to account for unusual fading situations and for fluctuations in the volume of traffic, leads to a Q channel data rate of approximately 6,400 bits per second. Frame synchronization and the other overhead on the Q channel will occupy additional bits in each frame. Thus, an arbitrary figure of 1,600 bits per second is advantageously added to the 6,400 bits per second to provide a total data rate of 8,000 bits per second on the Q channel. Thus, the data rate of the Q channel is ⅛th of the data rate on the P channel. As set forth above, the amount of attenuation that can be tolerated by the lower data rate channel is directly related to the data rate. In this example, using a data rate ⅛th that of the higher data rate channel provides a 9 dB advantage over the P channel (i.e., $10 \log_{10} 8 = 9$ dB). If a 10 dB advantage is desired, then an additional decibel may be provided by running the Q channel at a power level of 1.25% of the P channel's power level (i.e., $10 \log_{10} 1.25 = 0.97$ dB).

When a receiving ground station, such as the receiving ground station 204, detects excess attenuation caused by rain fade, as indicated by the signal on the fade indicator line 478 from the demodulator 466, a signal is communicated from the receiving ground station 204 to the transmitting ground station 200 to indicate to the transmitting ground station 200 that rain fading is occurring. Preferably, the fade indicator signal on the line 478 occurs before the fading has reached a level such that the P channel signal is no longer receivable. The fade indication signal can be transmitted from the receiving ground station 204 to the transmitting ground station 200 in any of a number of conventional manners. For example, the receiving ground station 204 can include a transmitting antenna (not shown) to transmit signals to the transmitting ground station 200 via the satellite 202. Alternatively, the receiving ground station 204 can communicate to the transmitting ground station 200 by land communication links, such as electrical wires, microwave repeaters, or the like.

When the transmitting ground station 200 receives the fade indication from the receiving ground station 204, the data being transmitted to the receiving ground station 460 is allocated at an appropriate number of time slots on the Q channel. Further, appropriate control signals are transmitted over the Q channel to the ground station 204 to allocate the selected time slots to the ground station 204. The decoder 480 and the demultiplexer 486 are thus reconfigured to obtain the data information from the allocated time slot of the Q channel rather than from the P channel. When the fade indicator output on the line 478 from the demodulator 466 again detects normal reception of the P channel, the receiving ground station 204 again communicates with the transmitting ground station 200 to indicate that normal communication can be resumed on the P channel. Meanwhile, other ground stations which may be experiencing rain fade on the P channel can request that one or more time slots on the Q channel be allocated to those stations.

Although described above in connection with communications between two ground-based locations, the present invention can also advantageously use the features described above to communications between a satellite and ground, and vice versa. For example, an orbiting satellite, such as a weather satellite, typically transmits data indicative of the status of the satellite as well as data from the weather observation instrumentation. Although it is preferable that the instrumentation data be transmitted on a real-time basis, there may be occasions when atmospheric weather conditions attenuate the transmitted signals to a level such that they cannot be received. In such cases, the satellite can store the data until the weather condition permits transmission. On the other hand, the satellite status information needs to be monitored on a continuous basis to assure that the satellite remains on a stable condition. The present invention enables the satellite to transmit the status information at a lower data rate in the presence of attenuation. Furthermore, the receiving ground station can remain synchronized with the satellite so that an acquisition procedure does not have to be performed in order to resume full communication after the attenuating weather condition no longer affects the data communications on the higher data rate channel.

As is known in the art, the ability to receive digital data in a satellite communications system is dependent in part upon a number of factors, such as the size of the receiving antenna, the quality, and thus the cost of the receiving equipment, the location of the receiving equipment, etc. For example, a larger antenna generally will enable a receiving ground station to discriminate data signals at a higher data rate than can be received using a smaller antenna. Thus, the present system can be advantageously used to transmit data at the higher data rate to ground stations having larger stationary antennas while the lower data channel can be used for communication directed to the smaller antennas that cannot reliably receive the higher data rate signals. For example, the present invention can be used to transmit signals to a van or other mobile equipment having a small roof-mounted antenna.

Although described above in connection with a preferred embodiment, the present invention can be modified without going beyond the scope of the invention as defined by the appended claims. For example, the ratio between the channel data rate and the Q channel data rate of 8 to 1 is by way of example only and can vary in accordance with the desires of a particular user.

The invention has been described above in connection with data transmitted in frames, as illustrated in FIG. 2. One skilled in the art will understand that the present invention can be advantageously used for the transmission of two independent data streams that are not synchronized with each other prior to being input to the modulator 220 (FIG. 3). For example, the P and Q inputs to the modulator 220 can be from two independently operated teletypes or other asynchronous data generation equipment, such as may be used in the broadcast mode of operation, described above. The two data streams are synchronized in the modulator 220 to provide the fixed timing relationship between the two data streams that enables the present invention to operate in the presence of signal attenuation.

In an exemplary communications system providing two-way communications between two locations, the transmitter at each of the two locations incorporates the modulator of the present invention and the receiver at each location incorporates the demodulator of the present invention. For example, a two-way telephone link can be provided on the high data rate channel while a two-way digital data link between computer terminals can be provided on the low data rate channel. Although the telephone conversation may be impaired or interrupted by rain fading, the data communications between the two terminals at the low data rate channel can continue because of the improved noise margins provided by this invention.

What is claimed is:

1. A communications system for transmitting digital data from a first location to a second location, comprising:

means at said first location for providing to digital data in first and second input data streams at first and second data rates, respectively, wherein the second data rate is faster than the first data rate, and for synchronizing the first and second input data streams in a fixed timing relationship, with at least said first input data stream providing timing for the first and second input data streams;

means electrically connected to the means for providing digital data, for generating a first phase modulated output signal having a phase relative to a reference phase that is responsive to the data of the first and second input data streams, said phase relative to said reference phase having a first component responsive to the data of said first input data systems and having a second component responsive to the data of said second input data stream, said second component variable independent of said first component, said first component and said second component of said first phase modulated output signal providing two distinct, noninterfering data communications channels at the same time;

means responsive to the first phase modulated output signal for transmitting a radio frequency signal modulated by said first phase modulated output signal;

means at said second location for receiving a radio frequency signal corresponding to said transmitted radio frequency signal and for generating a second phase modulated output signal corresponding to the first phase modulated output signal; and means for demodulating the second phase modulated output signal to provide first and second output data streams at said first and second data rates, respectively, wherein said first and second output data streams correspond, respectively, to said first and second input data streams, and wherein the means for demodulating provides the first output data stream independently of the second output data stream so that timing information encoded on said first output data stream can be decoded independent of the second output data stream, said first data rate selected to be sufficiently slower than said second data rate so that said means for demodulating continues to provide said first output data stream in the presence of signal attenuation between said first and second locations that prevents said means for demodulating from providing said second output data stream, said first output data stream providing timing for said second output data stream.

2. The communications system as defined in claim 1 wherein said first phase modulated output signal has a first modulation power level responsive to said first input data stream and a second modulation power level responsive to said second input data stream.

3. The communications system as defined in claim 2 wherein one of said first and second modulation power levels is greater than the other of said first and second modulation power levels.

4. A communications system for transmitting digital data from a first location to a second location, comprising:

means at said first location for providing the digital data in first and second input data streams at first and second data rates, respectively, wherein the second data rate is faster than the first data rate and said second data rate is an integer multiple of said first data rate, and for synchronizing the first and second input data streams in a fixed timing relationship, with at least said first input data stream providing timing for the first and second input data streams;

means electrically connected to the means for providing digital data, for generating a first phase modulated output signal having a phase relative to a reference phase that is responsive to the data of the first and second input data streams, said means for generating said first phase modulated output signal including means for spreading the data in said first input data stream to provide a spread data stream at said second data rate, said first phase modulated output signal responsive to said spread data stream so that said first phase modulated output signal has substantially the same modulation bandwidth for each of said first and second input data streams;

means responsive to the first phase modulated output signal for transmitting a radio frequency signal modulated by said first phase modulated output signal;

means at said second location for receiving a radio frequency signal corresponding to said transmitted radio frequency signal and for generating a second phase modulated output signal corresponding to the first phase modulated output signal; and means for demodulating the second phase modulated output signal to provide first and second output data streams at said first and second data rates, respectively, wherein said first and second output data streams correspond, respectively, to said first and second input data streams, and wherein the means for demodulating provides the first output data stream independently of the second output data stream so that timing information encoded on said first output data stream can be decoded independent of the second output data stream.

5. The communications system as defined in claim 4 wherein said means for demodulating said second phase modulated output signal comprises:

means for separating said second phase modulated output signal into first and second unstabilized output data streams; and means for converting said first and second unstabilized output data streams into first and second stabilized output data streams corresponding to said first and second output data streams.

6. The communications systems as defined in claim 5 wherein said first stabilized output data stream corresponds to said spread data stream at said second data rate, and wherein said demodulating means includes means for converting said first stabilized output data stream to said first output data stream at said first data rate.

7. A communication system for reliably transmitting digital data from a first location to a second location, comprising:

means for generating first and second source data streams having first and second data rates, said second data rate higher than said first data rate;

means for synchronizing the first and second source data streams in a fixed timing relationship with each other, said means for synchronizing further providing data synchronization information as part of said first source data stream that synchronized said first source data stream with said second source data stream;

means for quadrature phase modulating a radio frequency carrier with said first and second source data streams, said first source data stream shifting the phase of said radio frequency carrier to provide a first phase shift component, said second source data stream shifting the phase of said radio frequency carrier to provide a second phase shift component, said first and second phase shift components selected to be non-interfering to provide two simultaneous distinct communications channels on said radio frequency carrier;

means for transmitting said carrier from the first location to the second location;

means at said second location for receiving a signal corresponding to said transmitted signal; and means for demodulating said received signal to generate first and second received data streams, said first received data stream corresponding to said first source data stream and including said data synchronization information, said second received data stream corresponding to said second source data stream, wherein said lower data rate of said first source data stream is selected to be sufficiently lower than said second data rate to enable said first received data stream to be demodulated in the presence of signal attenuation that prevents demodulation of said second received data stream, said first received data stream continuing to provide said synchronization information for said second received data stream regardless of whether said second received data stream is demodulated.

8. A communications system for reliably transmitting digital data from a first location to a second location, comprising:

means for generating first and second source data streams having first and second data rates, said second data rate higher than said first data rate;

means for synchronizing the first and second source data streams in a fixed timing relationship with each other;

means for quadrature phase modulating a radio frequency carrier with said first and second source data streams;

means for transmitting said carrier from the first location to the second location;

means at said second location for receiving a signal corresponding to said transmitted signal; and means for demodulating said received signal to generate first and second received data streams, said first received data stream corresponding to said first source data stream and said second received data stream corresponding to said second source data stream, said means for demodulating said received signal comprising:

a translation circuit for converting said received signal into first and second digital data signals each having a magnitude that varies in response to said first and second source data streams, said translation circuit comprising:

a controllable oscillator for generating first and second mixing signals at substantially the same frequency as said received signal;

first and second frequency mixers responsive to said first and second mixing signals, respectively, and responsive to said received signal for generating first and second analog signals; and first and second analog-to-digital convertors for receiving said first and second analog signals and for generating said first and second digital data signals at a sampling rate that is at least twice the second data rate; and a set of tracking circuits for receiving said first and second digital data signals from said translation circuit and for converting said first and second digital data signals into first and second digital reproductions of said first and second source data streams, respectively, said first digital reproduction comprising data at said first data rate and said second digital reproduction comprising data at said second data rate, said set of tracking circuits further providing a frequency control signal to said translation circuit to control the frequency of said controllable oscillator and a sampling signal to control the sampling rate of said analog-to-digital convertors, wherein said lower data rate of said first data stream enable s said first data stream to be demodulated in the presence of signal attenuation that prevents demodulation of said second data stream.

9. The communications system as defined in claim 8, wherein said set of tracking circuits comprises:

a coordinate conversion circuit for receiving said first and second digital data signals and for converting said first and second digital data signals into first and second intermediate data streams at said second data rate, said second intermediate data stream corresponding to said second digital reproduction of said second source data stream, said coordinate conversion block further producing an angular output signal having a magnitude proportional to an angular phase difference between said received signal and one of said first and second mixing signals;

a despread circuit for receiving said first and second intermediate data streams at said second data rate and for converting said first and second intermediate data streams to first and second despread data streams at said first data rate, said first despread data stream corresponding to said first digital reproduction of said first source data stream;

a frequency tracking circuit for receiving said angular output signal from said coordinate conversion circuit and for generating an angular correction signal to said coordinate conversion circuit to correct for angular phase differences between said received signal and said one of said first and second mixing signals, said circuit further generating said frequency control signal to control the frequency of said controllable oscillator in said translation circuit; and a clock oscillator circuit for generating said sampling signal to control the time at which said first and second analog-to-digital convertors sample said first and second analog signals, said time controlled so that said first and second analog signals are samples at times corresponding to maximum and minimum magnitudes of said first and second analog signals.

10. A method of transmitting digital data from a first location to a second location, comprising the steps of:

generating first and second source data streams, said first source data stream having a first data rate and said second source data stream having a second data rate higher than said first data rate synchronizing said second source data stream with said first source data stream so that said second source data stream has a fixed timing relationship with said first source data stream;

providing timing information in said first source data stream for said first source data stream and said second source data stream;

quadrature phase modulating a radio frequency carrier with said first and second source data streams such that said radio frequency carrier is shifted in phase by a first component responsive to said first source data stream and shifted in phase by a second component responsive to said second source data stream, said second component independent of said first component so that two independent data communications channels are provided on said radio frequency carrier;

transmitting said carrier form a first location to a second location;

receiving said transmitted signal at second location as a received signal;

demodulating said received signal to generate first and second received data streams, said first received data stream corresponding to said first source data stream and said second received data stream corresponding to said second source data stream, said first received data stream including timing information for said first received data stream and said second received data stream;

selecting said lower data rate of said first source data stream to be sufficiently lower than said higher data rate of said second source data stream so that said first received data stream can be demodulated in said demodulating step in the presence of signal attenuation that prevents demodulation of said second received data stream.

11. A system for transmitting digital data from a first ground location to a second ground location via an orbiting relay satellite, comprising:

a source of digital data, said digital data comprising a first input data stream having a first data rate, and a second input data stream having a second data rate higher than said first data rate, said first input data stream and said second input data stream synchronized so that said first input data stream and said second input data stream have a fixed timing relationship, said first input data stream providing timing information for said first input data stream and said second input data stream;

a quadrature phase modulator electrically connected to receive said first and second input data stream, said modulator generating a first phase modulated output signal having a phase relative to a reference phase that is responsive to the data of said first and second input data streams;

a transmitter electrically coupled to said modulated output signal for generating a first radio frequency signal modulated by said modulated output signal, and an antenna electrically connected to said transmitter for radiating said first radio frequency signal toward said satellite wherein a second radio frequency signal responsive to said first radio frequency signal is transmitted toward said second ground location;

an antenna and receiver combination at said second ground location for receiving said second radio frequency signal transmitted by said satellite, said receiver generating a second phase modulated output signal corresponding to said first phase modulated output signal; and a demodulator electrically connected to receive said second phase modulated output signal from said receiver, said demodulator generating a first output data stream at said first data rate, said first output data stream corresponding to said first input data stream, and a second output data stream at said second data rate, said second output data stream corresponding to said second input data stream, wherein said first output data stream is demodulated independently of said second output data steam so that timing information provided by said first input data stream can be reproduced independent of whether said second output data stream is demodulated, said first data rate selected to be sufficiently lower than said second data rate so that said first output data stream can be demodulated in the presence of signal attenuation that prevents the demodulation of said second output data stream.

12. In a satellite communications system, a method of mitigating the loss of signals caused by atmospheric attenuation, comprising the steps of:

generating first and second source data streams having first and second data rates, said second data rate higher than said first data rate, said first source data stream including data synchronization information, said second source data stream having a fixed timing relationship to said first source data stream so that said second source data stream is synchronized with said data synchronization information of said first source data stream;

quadrature phase modulating a radio frequency carrier with said first and second source data streams to provide two independent communications channels on said radio frequency carrier for said first and second source data streams;

transmitting said carrier from a first location to a second location via an orbiting relay satellite;

receiving said transmitted signal at said second location as a received signal;

demodulating said received signal to generate first and second received data streams, said first received data stream corresponding to said first source data stream and said second received data stream corresponding to said second source data stream, said first received data stream including said data synchronization information for said first and second received data streams; and selecting said lower data rate of said first source data stream to be sufficiently lower than said higher data rate of said second source data stream such that said first received data stream can be demodulated in said demodulating step in the presence of signal attenuation that prevents demodulation of said second received data stream, said first received data stream providing synchronization for both said first received data stream and said second received data stream regardless of whether said second data stream is demodulated.

13. A method for transmitting digital data through the earth's atmosphere at a frequency susceptible to attenuation by precipitation, comprising the steps of:

providing first and second source digital data streams at first and second digital data rates, said second digital data rate higher than said first digital data rate;

synchronizing said first source digital data stream with said second source digital data stream so that said second source digital data stream has a fixed timing relationship to said first source digital data stream;

providing timing information in said first source digital data stream for said first source digital data stream and said second source digital data stream;

phase modulating a radio frequency carrier with said first source digital data stream, to provide a first phase modulated signal;

phase modulating said radio frequency carrier with said second source digital data stream, to provide a second phase modulated signal in quadrature with said first phase modulated signal;

combining said first phase modulated signal and said second phase modulated signal to provide a combined quadrature phase shift modulated signal;

transmitting said combined signal;

receiving a combined signal responsive to said transmitted signal;

demodulating said received signal to generate a first output signal at said first digital data rate, said first output signal corresponding to said first source digital data stream and including said synchronization information, and to generate a second output signal at said second digital data rate, said second output signal corresponding to said second source data stream and synchronized with said synchronization information;

selecting said first source digital data rate to be sufficiently lower than said second source digital data rate such that said first output signal can be demodulated in said demodulating step to provide said synchronization information in the presence of precipitation attenuation that prevents the demodulation of said second output signal.

* * * * *

UNITED STATES PATENT AND TRADEMARK OFFICE
CERTIFICATE OF CORRECTION

PATENT NO. : 4,837,786

DATED : June 6, 1989

INVENTOR(S) : Itzhak Gurantz, et al.

It is certified that error appears in the above-identified patent and that said Letters Patent is hereby corrected as shown below:

Delete the drawings and substitute therefor the attached ten (10) sheets of drawing figures.

In column 4, at line 40, delete "unlink" and insert therefor --uplink--.

In column 5, at line 37, before "stabilized" insert --the--; at line 42, delete "frequency track"; and at line 62, delete "FIG. 17a" and insert therefor --FIG. 17b--.

In column 6, move the text beginning at line 32, with "on the radio" and continuing through the first occurrence of "the" at line 67, and insert this text in column 8, at line 41, after "data information imposed".

In column 10, at line 36, delete "left, and" and insert therefor --bottom.--. Also in column 10, delete lines 37 and 38; and at line 46, after "causes" insert --a phase shift of--.

In column 12, at line 17, delete the second occurrence of "channel"; at line 22, delete "/8th"; and at line 23, delete "6a)-" and insert therefor --6a).--.

In column 16, at line 26, delete "502 o cause" and insert therefor --502 to cause--.

In column 18, at line 59, delete "PRU" and insert therefor --$P_{RU}$--.

In column 19, at line 16, delete "PRS" and insert therefor --$P_{RS}$--; at line 24, delete "hould" and insert therefor --should--; and at line 62, delete "h$\rho$" and insert therefor --$\rho$--.

UNITED STATES PATENT AND TRADEMARK OFFICE
CERTIFICATE OF CORRECTION

PATENT NO. : 4,837,786

DATED : June 6, 1989

INVENTOR(S) : Itzhak Gurantz, et al.

It is certified that error appears in the above-identified patent and that said Letters Patent is hereby corrected as shown below:

In column 21, at line 12, delete "70°" and insert therefor --270°--; at line 24, delete "angle e" and insert therefor --angle $\theta$--; and at line 26, delete "80°" and insert therefor --180°--.

In claim 10, at column 38, line 3, delete "form" and insert therefor --from--.

Signed and Sealed this

Twenty-third Day of April, 1991

Attest:

HARRY F. MANBECK, JR.

*Attesting Officer*            *Commissioner of Patents and Trademarks*

Fig. 6a P DATA

Fig. 6b Q DATA

Fig. 6c SEQUENCE GENERATOR OUTPUT

Fig. 6d Q' DATA